United States Patent
Abotabl et al.

(10) Patent No.: US 12,513,695 B2
(45) Date of Patent: Dec. 30, 2025

(54) UPLINK CONFIGURED GRANT RETRANSMISSION BASED ON TIME INTERVAL FOR AT LEAST DOWNLINK COMMUNICATION

(71) Applicant: QUALCOMM Incorporated, San Diego, CA (US)

(72) Inventors: Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/182,022

(22) Filed: Mar. 10, 2023

(65) Prior Publication Data
US 2024/0306146 A1    Sep. 12, 2024

(51) Int. Cl.
*H04W 72/1268* (2023.01)
*H04W 76/28* (2018.01)

(52) U.S. Cl.
CPC ....... *H04W 72/1268* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2019/0199503 A1* | 6/2019 | Son | H04W 80/08 |
| 2020/0146034 A1* | 5/2020 | Bagheri | H04L 1/1822 |
| 2020/0344835 A1* | 10/2020 | Wang | H04L 1/1896 |
| 2021/0175955 A1* | 6/2021 | Kung | H04W 80/02 |
| 2022/0015187 A1* | 1/2022 | Huang | H04W 72/1268 |
| 2022/0232596 A1* | 7/2022 | Lu | H04W 76/28 |
| 2024/0267987 A1* | 8/2024 | Babaei | H04W 76/28 |

FOREIGN PATENT DOCUMENTS

EP    3920447 A1 * 12/2021    ......... H04W 74/002

OTHER PUBLICATIONS

Chochliouros I.P., et al., "Energy Efficiency Concerns and Trends in Future 5G Network Infrastructures", Energies 2021, vol. 14, No. 17, 5392, Aug. 30, 2021, pp. 1-14.
Hatt T., et al., "5G Energy Efficiencies Green is the New Black," GSMA Intelligence, Nov. 2020, 26 pages.
Huawei: "New SI: Study on Network Energy Savings for NR," 3GPP Draft, 3GPP TSG RAN Meeting #94e, RP-213554 (revision of RP-212709), Electronic Meeting, Dec. 6-17, 2021, Dec. 10, 2021, 16 Pages.

* cited by examiner

*Primary Examiner* — Jamaal Henson
(74) *Attorney, Agent, or Firm* — Dinsmore & Shohl LLP

(57) ABSTRACT

Various aspects of the present disclosure generally relate to wireless communication. In some aspects, a user equipment (UE) may receive a first configuration of a retransmission timer. The UE may receive a second configuration of a first time interval for uplink communication and a second time interval for at least downlink communication. The UE may transmit an uplink communication associated with a configured grant. The UE may monitor for a physical downlink control channel (PDCCH) transmission during a time window based at least in part on the retransmission timer, the time window being based at least in part on the second time interval. Numerous other aspects are described.

27 Claims, 16 Drawing Sheets

UPLINK CONFIGURED GRANT RETRANSMISSION BASED ON TIME INTERVAL FOR AT LEAST DOWNLINK COMMUNICATION

FIELD OF THE DISCLOSURE

Aspects of the present disclosure generally relate to wireless communication and to techniques and apparatuses for retransmitting an uplink configured grant based on a time interval for at least downlink communication.

BACKGROUND

Wireless communications systems are widely deployed to provide various telecommunication services, such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving a first configuration of a retransmission timer. The method includes receiving a second configuration of a first time interval for uplink communication and a second time interval for at least downlink communication. The method includes transmitting an uplink communication associated with a configured grant. The method includes monitoring for a physical downlink control channel (PDCCH) transmission during a time window based at least in part on the retransmission timer, the time window being based at least in part on the second time interval.

Another aspect provides a method for wireless communication by a network entity. The method includes outputting a first configuration of a retransmission timer. The method includes outputting a second configuration of a first time interval for uplink communication and a second time interval for at least downlink communication. The method includes obtaining an uplink communication associated with a configured grant, wherein a time window for a PDCCH transmission triggering retransmission of the uplink communication is based at least in part on the retransmission timer, the time window being based at least in part on the second time interval.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
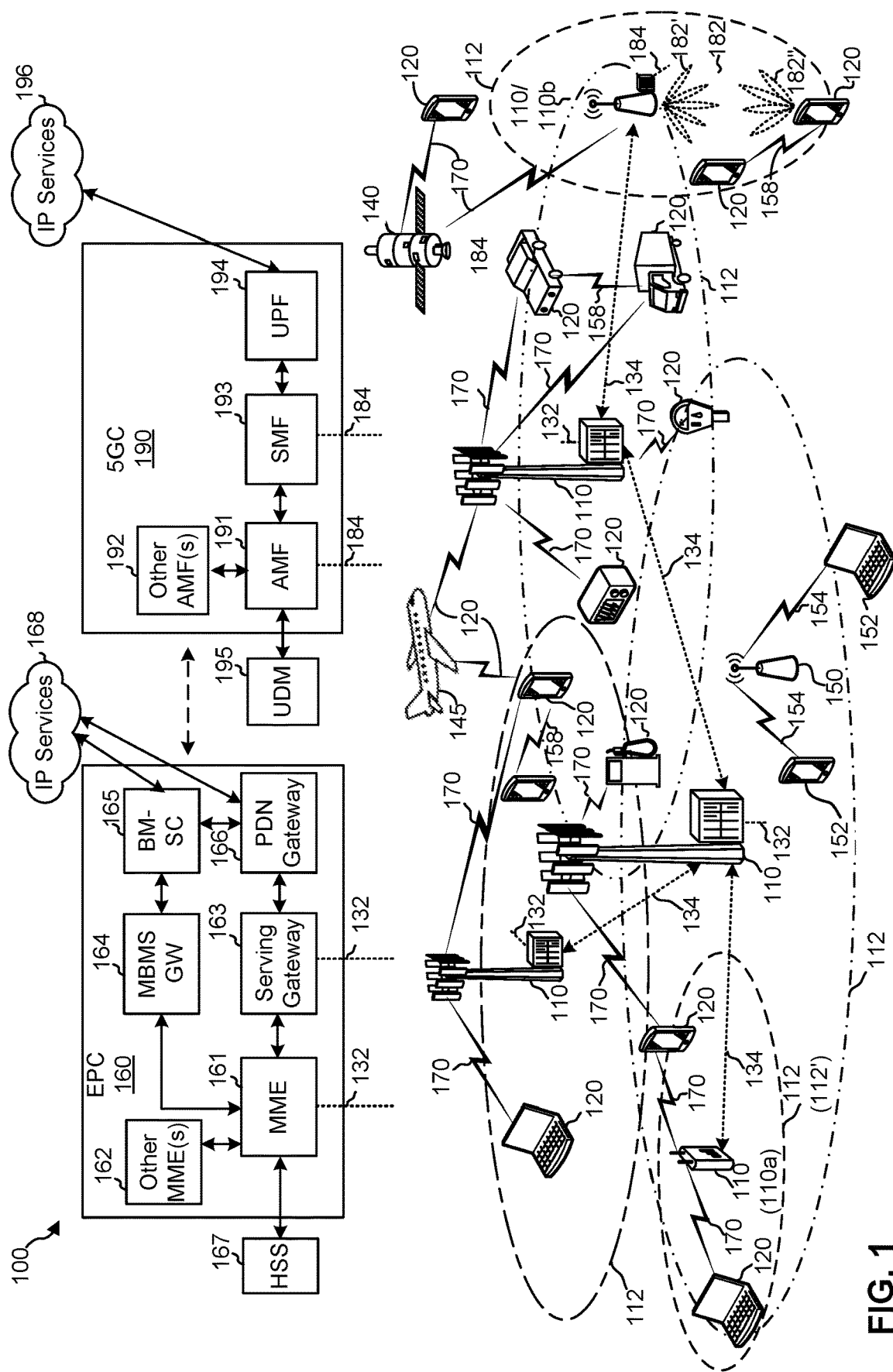
FIG. 1 depicts an example of a wireless communications network, in accordance with the present disclosure.

Aspects of the present disclosure provide apparatuses, methods, processing systems, and computer-readable mediums for retransmitting an uplink configured grant based on a time interval for at least downlink communication.

A user equipment (UE) and a network entity (e.g., a base station (BS)) may exchange transmissions in accordance with a duty cycle configured to reduce energy consumption. For example, the duty cycle may transition between intervals for uplink communications and intervals for both uplink and downlink communications. In some instances, the intervals for uplink communications may be intervals for uplink-only communications. By limiting when the network entity can transmit downlink communications, the duty cycle may offer potential energy savings for both the network entity and the UE because the UE can reduce the amount of time and energy spent monitoring for or receiving downlink communications.

However, in some situations, the duty cycle may prevent the network entity from providing a transmission to the UE. For example, consider a scenario in which the UE is configured with a configured grant (CG) configuration and the network entity does not receive a corresponding physical uplink shared channel (PUSCH) communication, transmitted by the UE, in the scheduled CG occasion. The UE may be configured to monitor for an indication to retransmit the PUSCH communication for a given time window. However, if the time window overlaps with the uplink communication interval of the duty cycle, the UE may use energy resources (e.g., battery power) monitoring for the retransmission indication during the uplink communication interval in which the network entity is configured to refrain from providing physical downlink control channel (PDCCH) transmissions, such as the retransmission indication. Moreover, if the time window does not overlap with an interval for both uplink and downlink communications, the network entity may not provide any retransmission indication to the UE and, as a result, may never receive the PUSCH communication from the UE. Overriding the uplink communication interval of the duty cycle to enable the network entity to provide the retransmission indication would also reduce or eliminate the network energy savings conferred by the duty cycle for the UE and the network entity.

Some techniques described herein may provide signaling and time window configurations related to retransmitting a PUSCH communication, such as associated with a CG, to a network entity notwithstanding the presence of any uplink communication intervals of a cycle (e.g., an operation cycle, such as a duty cycle). For example, a UE may monitor for a PDCCH transmission (e.g., a retransmission indication) during a time window based at least in part on a retransmission timer. The time window may be based at least in part on a time interval for at least downlink communication of the cycle. For example, the time window may be adapted to overlap or align with the time interval. Basing the time window at least in part on the time interval may allow the uplink communication interval to persist while ensuring that the UE may reliably receive retransmission indications from a network entity. Thus, the UE may benefit from the network energy savings (e.g., battery power savings) conferred by the uplink communication interval with minimal PUSCH communications lost.

In some aspects, the time window may be fully overlapped with the time interval for at least downlink communication. For example, the time window may be reduced relative to another time window that is defined by a configuration (e.g., indicating a drx-RetransmissionTimerUL parameter) received from a network entity and that is at least partially non-overlapped with the time interval for at least downlink communication. Fully overlapping the time window with the time interval for at least downlink communication may permit the UE to monitor for downlink communications during only the time interval for at least downlink communication. As a result, the UE may conserve energy (e.g., battery power) by avoiding unnecessary monitoring of downlink communications during the uplink communication interval.

In some aspects, a start of the time window may be aligned with a start of the time interval for at least downlink communication. In some examples, the alignment may be based at least in part on the start of another time window that is defined by a configuration (e.g., indicating a drx-RetransmissionTimerUL parameter) received from a network entity. The start of the other time window may not be aligned with the start of the time interval for at least downlink communication, or the other time window may overlap with the time interval for at least downlink communication by less than a threshold amount of time (or may not overlap the time interval for at least downlink communication). In some examples, the alignment may cause the time window to overlap with one or more additional time intervals for at least downlink communication (e.g., where the additional time intervals are after the time interval for at least downlink communication). The additional time intervals may offer the network entity further opportunities to provide any PDCCH transmission, such as a retransmission indication.

In some examples, the alignment of the start of the time window and the start of the time interval for at least downlink communication may be based at least in part on the UE transmitting an uplink communication within a length of a round-trip timer (e.g., a hybrid automatic repeat request (HARQ) round-trip timer) from the start of the time interval for at least downlink communication. For example, the UE may begin monitoring for PDCCH transmissions before the round-trip timer has expired. Permitting the UE to begin monitoring for PDCCH transmissions before the round-trip timer has expired—instead of waiting until after the round-trip timer has expired—may provide increased flexibility with respect to when the network entity may send a retransmission indication.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a BS, a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio BS, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
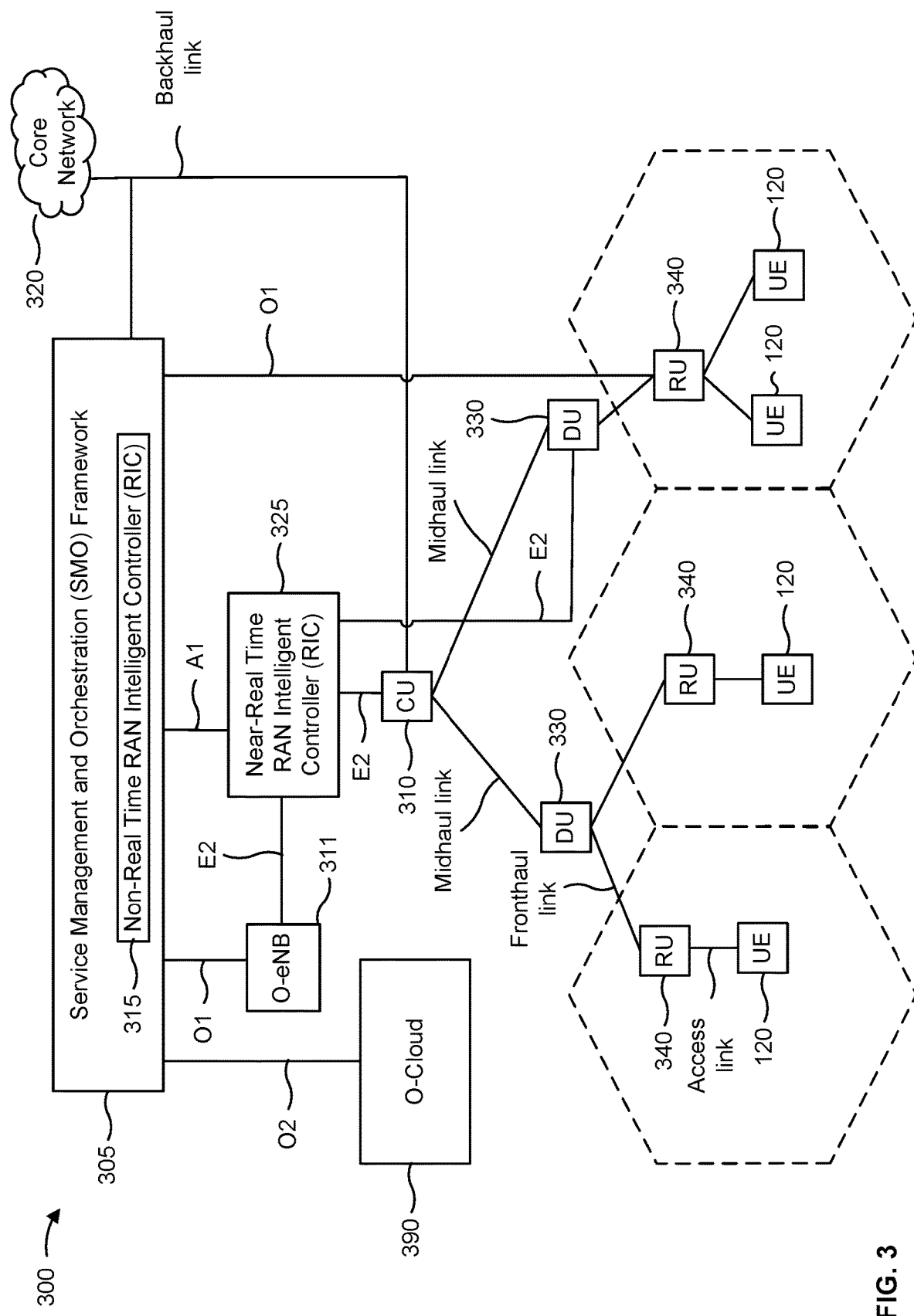
FIG. 3 depicts an example disaggregated BS architecture.

While BSs 110 are depicted in various aspects as unitary communications devices, BSs 110 may be implemented in various configurations. For example, one or more components of a BS may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A BS configured to communicate using mmWave or near mmWave radio frequency bands (e.g., a mmWave BS, such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., BS 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated BS, a disaggregated BS, a component of a BS, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
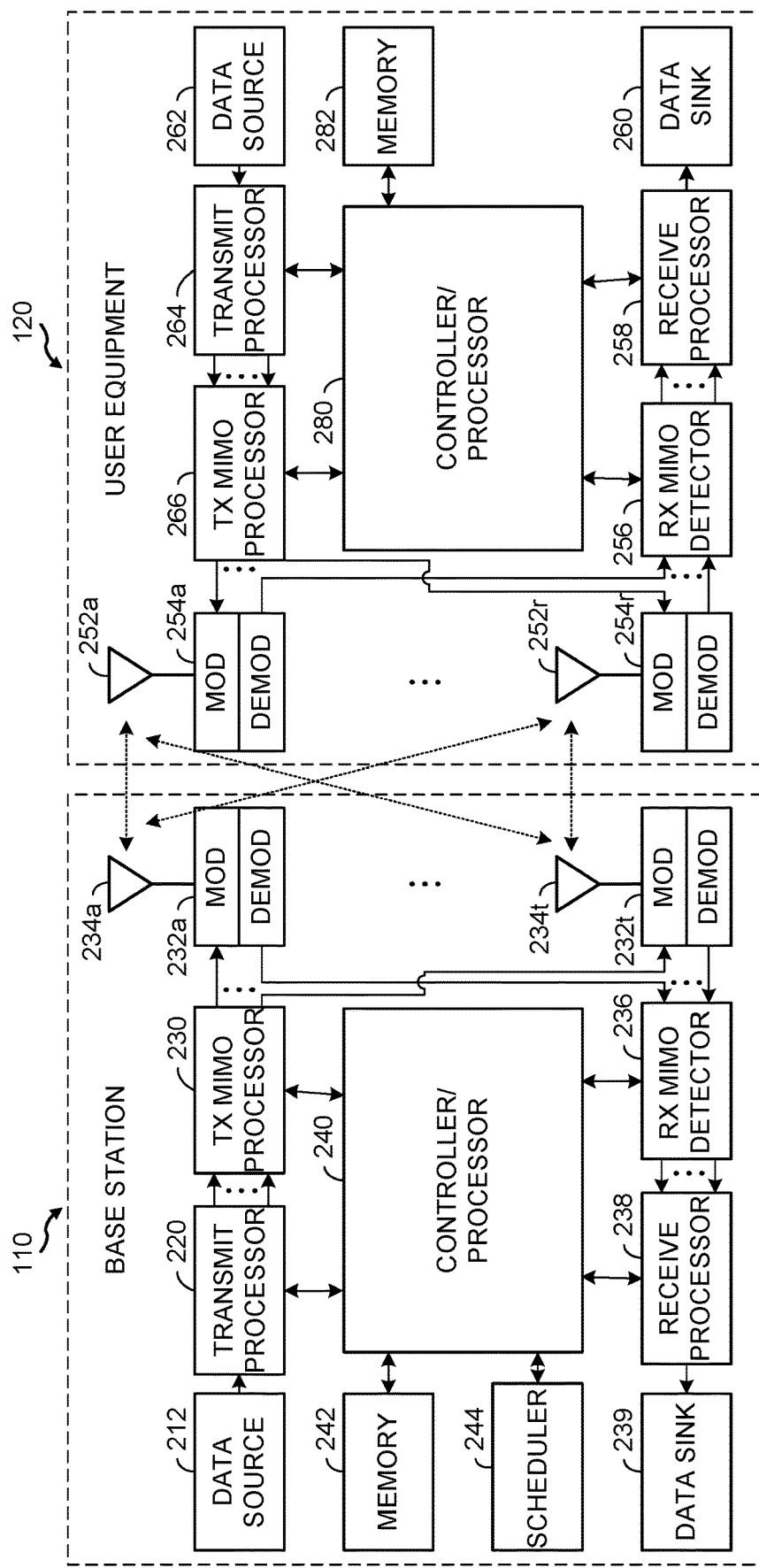
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a*-*t* (collectively 234), transceivers 232*a*-*t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a*-*r* (collectively 252), transceivers 254*a*-*r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical HARQ indicator channel (PHICH), the PDCCH, the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for single-carrier frequency division multiplexing (SC-FDM)), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, receive (RX) MIMO detector 236, controller/ processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a BS, or a network equipment may be implemented in an aggregated or disaggregated architecture. For example, a BS (such as a Node B (NB), an evolved NB (eNB), an NR BS, a 5G NB, an AP, a TRP, or a cell, among other examples), or one or more units (or one or more components) performing BS functionality, may be implemented as an aggregated BS (also known as a standalone BS or a monolithic BS) or disaggregated BS. "Network entity" or "network node" may refer to a disaggregated BS, or to one or more units of a disaggregated BS (such as one or more CUs, one or more DUs, one or more RUs, or a combination thereof).

An aggregated BS (e.g., an aggregated network node) may be configured to utilize a radio protocol stack that is physically or logically integrated within a single RAN node (e.g., within a single device or unit). A disaggregated BS (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

BS-type operation or network design may consider aggregation characteristics of BS functionality. For example, disaggregated BSs may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating BS functionality into one or more units that can be individually deployed. A disaggregated BS may include functionality implemented across two or more units at various physical locations, as well as functionality implemented for at least one unit virtually, which can enable flexibility in network design. The various units of the disaggregated BS can be configured for wired or wireless communication with at least one other unit of the disaggregated BS.

FIG. 3 depicts an example disaggregated BS 300 architecture. The disaggregated BS 300 architecture may include one or more CUs 310 that can communicate directly with a core network 320 via a backhaul link, or indirectly with the core network 320 through one or more disaggregated BS units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more BS functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
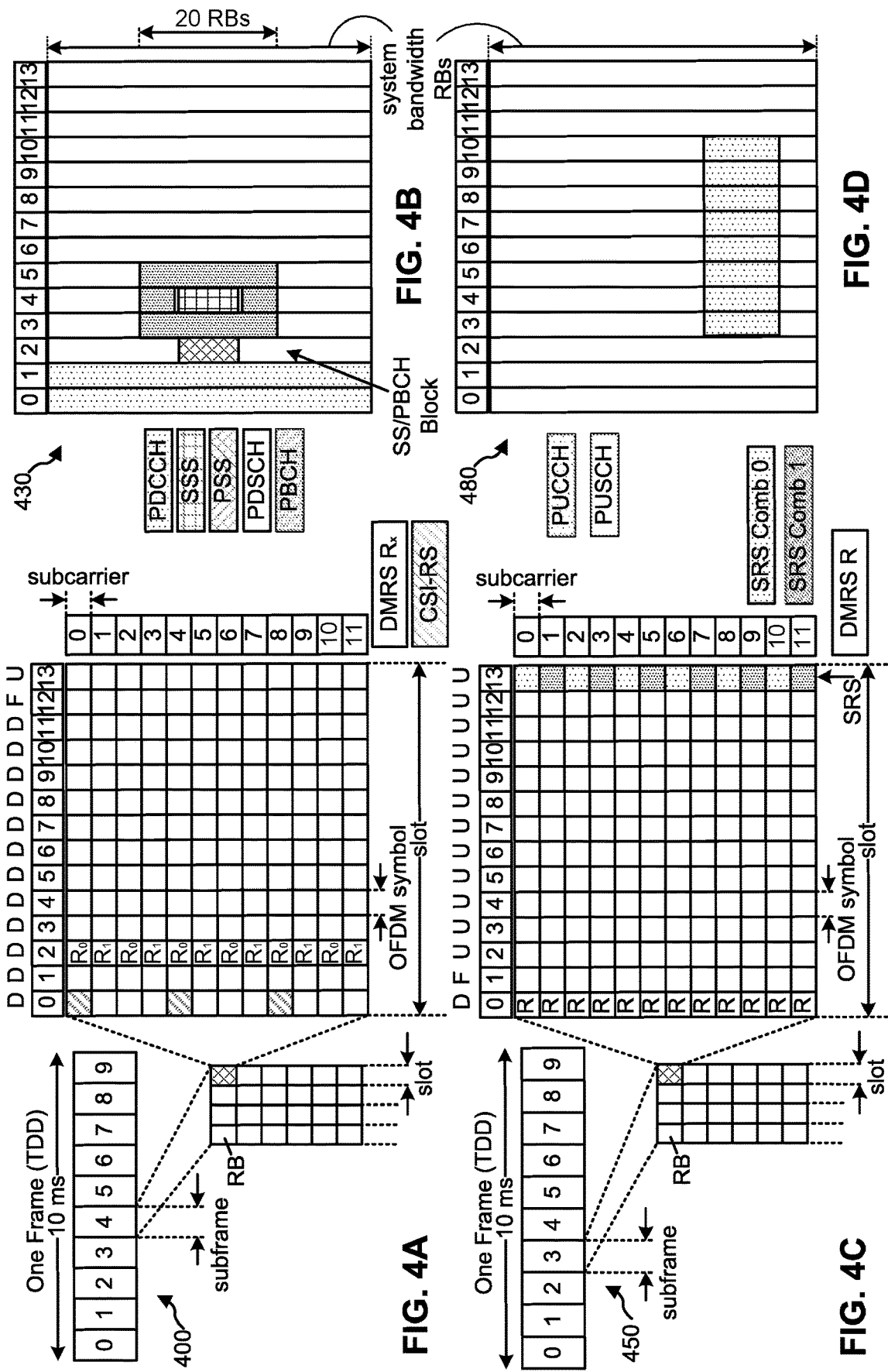
FIGS. 4A, 4B, 4C, and 4D depict aspects of data structures for a wireless communications network in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and SC-FDM partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ)

0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu \times 15$ kHz, where µ is the numerology index, which may be selected from values 0 to 5. Accordingly, the numerology µ=0 has a subcarrier spacing of 15 kHz and the numerology µ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (SSB). The MIB provides a number of RBs in the system bandwidth and a system frame number (SFN). The PDSCH carries user data, broadcast system information not transmitted through the PBCH, such as system information blocks (SIBs), and/or paging messages.

As illustrated in FIG. 4C, some of the REs carry DMRSs (indicated as R for one particular configuration, but other DMRS configurations are possible) for channel estimation at the BS. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
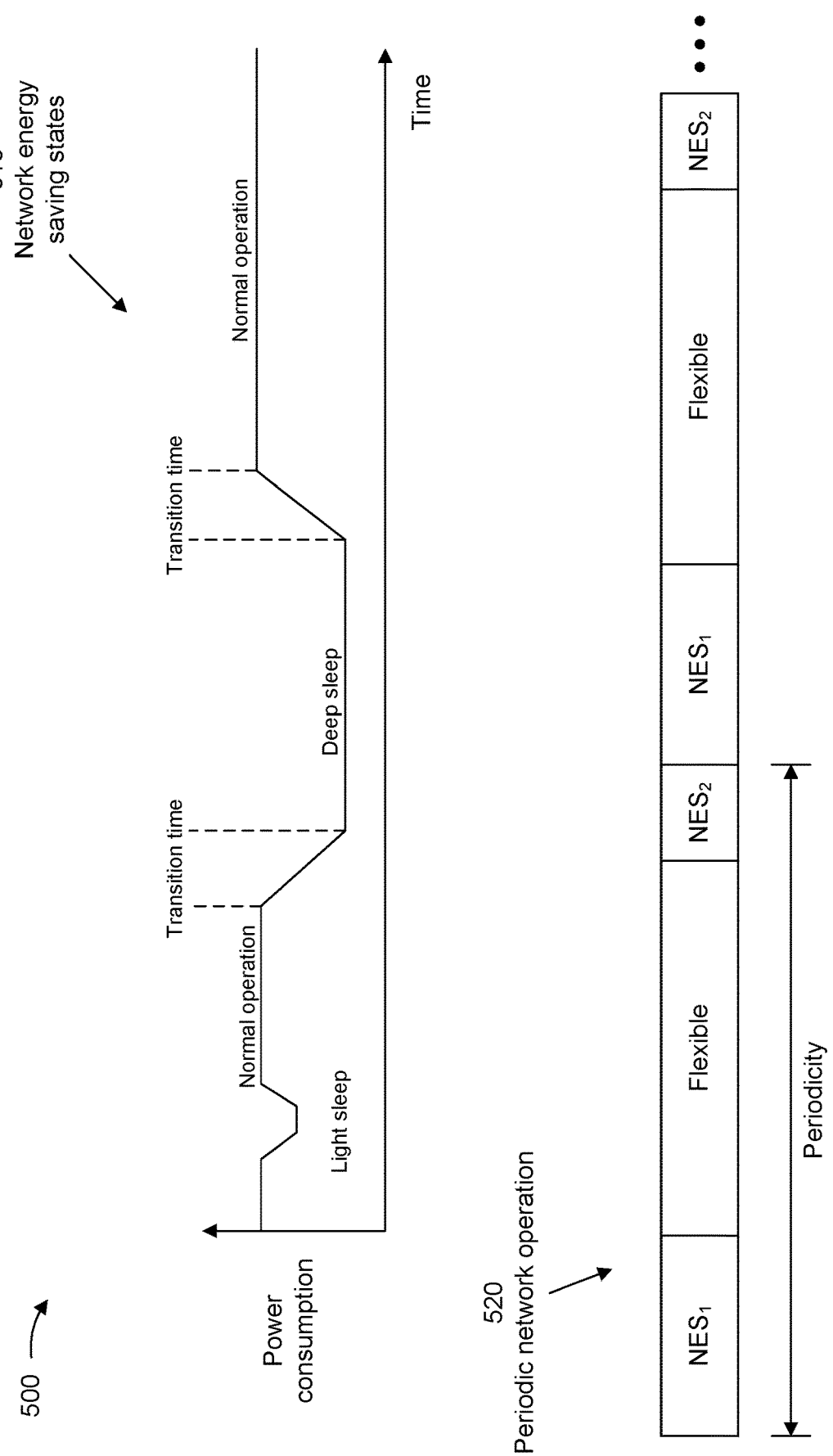
FIG. 5 is a diagram illustrating an example of network operations to reduce energy consumption, in accordance with the present disclosure.

FIG. 5 is a diagram illustrating an example 500 of network operations to reduce energy consumption, in accordance with the present disclosure. Network energy saving and/or network energy efficiency measures are expected to have increased importance in wireless network operations for various reasons, including climate change mitigation, environmental sustainability, and network cost reduction. For example, although NR generally offers a significant energy efficiency improvement per gigabyte over previous generations (for example, LTE), new NR use cases that demand high data rates and/or the adoption of millimeter wave frequencies may require more network sites, greater network density, more network antennas, larger bandwidths, and/or more frequency bands, which could potentially lead to a more efficient wireless network that nonetheless has higher energy requirements and/or causes more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). Most energy consumption and/or energy costs come from powering a RAN, which accounts for about half of the energy consumed by a wireless network. Accordingly, measures to increase network energy savings and/or network energy efficiency are important factors that may drive adoption and/or expansion of wireless networks.

One way to increase energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors, such as power amplifier (PA) efficiency, quantities of transceiver units (TxRUs), and/or network load, among other examples), enabling network sleep states and associated transition times, and/or defining appropriate reference parameters and/or configurations. For example, in some cases, different Network Energy Saving (NES) states may be configured to enable granular adaptation of transmission and/or reception to reduce energy consumption using techniques in time, frequency, spatial, and/or power domains, with potential support and/or feedback from UEs and/or potential UE assistance information. However, network devices and UEs may need to exchange and/or coordinate information over network interfaces to control configurations, communication parameters, and/or UE behavior for each NES state, which can increase configuration complexity and/or signaling overhead. This may pose challenges because techniques to reduce network energy consumption should generally be designed to avoid having a large impact on key performance indicators (KPIs) related to network and/or UE performance (for example, spectral efficiency, latency, UE power consumption, and/or complexity, among other examples).

Accordingly, as shown in FIG. 5, a network entity may be configured to operate in different NES states 510 over time, where each NES state 510 may use one or more techniques to adapt transmission and/or reception in time, frequency, spatial, and/or power domains. An NES state may be referred to herein as an energy state. A wireless communication device (e.g., a programmable logic controller (PLC) or a transmitting UE) can also use an NES state, which may adapt transmission and/or reception of the wireless communication device in time, frequency, spatial, and/or power domains. For example, as shown in FIG. 5, the NES states 510 of the network entity may include a normal operation mode (which may also be referred to as a legacy mode, a default mode, or a baseline mode) and one or more sleep modes that may be associated with a lower power consumption than the normal operation mode. In general, a network node may transition between different NES states 510 to save power and maintain network operation (for example, minimizing impact on KPIs, such as spectral efficiency, capacity, user perceived throughput (UPT), latency, UE power consumption, complexity, handover performance, call drop rate, initial access performance, and/or service level agreement assurance). Furthermore, the network node may transition between different sleep modes based on traffic demands (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or RF chains may be turned off in the deep sleep mode but remain on in the light sleep mode). Accordingly, as shown in FIG. 5, the normal operation mode and the different sleep modes may vary in terms of power consumption and may be associated with different transition times (for example, a transition time to or from the deep sleep mode may be longer than a transition time to or from the light sleep mode).

In some cases, as described herein, an NES state 510 may generally correspond to a particular set of configurations, communication parameters, and/or UE behaviors. For example, an NES state 510 may include a set of configurations, communication parameters, and/or UE behaviors associated with one or more energy saving techniques that are implemented in the time, frequency, spatial, and/or power domain to reduce energy consumption. For example, a network node may be configured to not transmit an SSB to reduce energy consumption in a first NES state 510 (for example, an SSB-less NES state 510), and may be configured to employ other energy saving techniques, such as turning off one or more antenna panels in a second NES state 510. Furthermore, in some cases, an NES state 510 may be associated with a set of configurations, communication parameters, and/or UE behaviors associated with the normal or legacy mode of network operation. Accordingly, because one design objective in energy-efficient wireless networks is to achieve more efficient operation dynamically and/or semi-statically, a network node may configure a periodic network operation 520 to achieve network energy savings. For example, as shown in FIG. 5, the periodic network operation 520 (for example, configured via RRC signaling) may include a sequence of NES states 510 that the network node follows in accordance with a given periodicity (for example, in FIG. 5, the network node operates in accordance with a first NES state, shown as $NES_1$, for a first time period, then operates in a flexible mode for a second time period, then operates in accordance with a second NES state, shown as $NES_2$, for a third time period, and the pattern then repeats). The NES states may be generic, predefined, or configured NES modes. In cases where the periodic network operation 520 includes a flexible mode, the network node may operate in accordance with any suitable NES state during the time period corresponding to the flexible mode (for example, depending on current traffic conditions), and the NES state that the network node selects for the time period corresponding to the flexible mode may be dynamically indicated to served UEs.

Thus, a UE may be configured with a time sequence of network operations that the UE performs over the course of periodic network operation 520. Examples of such network operations may include legacy operations, operations in accordance with generic, predefined, or configured NES modes, support operations (e.g., operations in accordance with a mode in which a network entity (e.g., a BS) increases a capability or coverage of the network entity to overcome an energy saving mode of neighboring network entities), flexible operations (e.g., operations that are not yet specified and will be implicitly known or dynamically indicated), or the like.

As indicated above, FIG. 5 is provided as an example. Other examples may differ from what is described with regard to FIG. 5.

Figure 6:
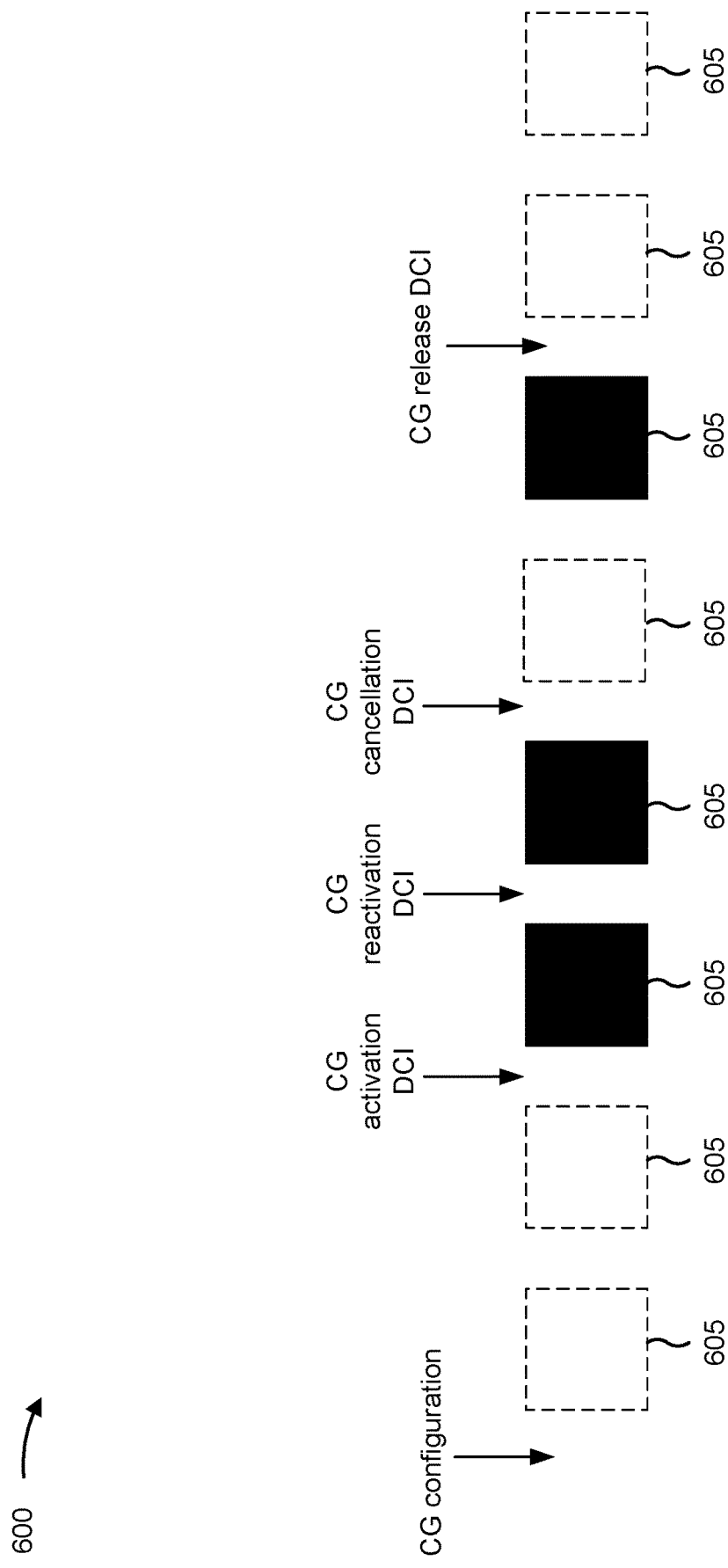
FIG. 6 is a diagram illustrating an example of uplink configured grant (CG) communication, in accordance with the present disclosure.

FIG. 6 is a diagram illustrating an example 600 of uplink CG communication, in accordance with the present disclosure. CG communications may include periodic uplink communications that are configured for a UE, such that the BS does not need to send separate DCI to schedule each uplink communication, thereby conserving signaling overhead. For example, in a CG paradigm, the UE may send a PUSCH communication through configured time-frequency resources to a BS without first obtaining a corresponding PDCCH communication specific to that PUSCH communication from the BS. CG communications may be suitable for periodic and/or predictable communications such as voice over IP (VoIP) communications, ultra-reliable low latency communications (URLLC), industrial IoT (IIoT) communications, or the like.

As shown in example 600, a UE may be configured with one or more CG configurations for CG communications. For example, the UE may receive the CG configuration via an RRC message transmitted by a BS. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 605 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure). In some examples, the UE may be configured to repeat a PUSCH CG transmission, which may increase reliability. The UE may be configured to send any suitable quantity of repeated transmissions (e.g., 1, 2, 4, 8, or the like).

The BS may transmit CG activation DCI to the UE to activate the CG configuration for the UE. The BS may indicate, in the CG activation DCI, communication parameters, such as a modulation and coding scheme (MCS), an RB allocation, and/or antenna ports, for the CG PUSCH communications to be transmitted in the scheduled CG occasions 605. The UE may begin transmitting in the CG occasions 605 based at least in part on receiving the CG activation DCI. For example, beginning with a next scheduled CG occasion 605 subsequent to receiving the CG activation DCI, the UE may transmit a PUSCH communication in the scheduled CG occasions 605 using the communication parameters indicated in the CG activation DCI. The UE may refrain from transmitting in configured CG occasions 605 prior to receiving the CG activation DCI.

The BS may transmit CG reactivation DCI to the UE to change the communication parameters for the CG PUSCH communications. Based at least in part on receiving the CG reactivation DCI, the UE may begin transmitting in the scheduled CG occasions 605 using the communication parameters indicated in the CG reactivation DCI. For example, beginning with a next scheduled CG occasion 605 subsequent to receiving the CG reactivation DCI, the UE may transmit PUSCH communications in the scheduled CG occasions 605 based at least in part on the communication parameters indicated in the CG reactivation DCI.

In some cases, such as when the BS needs to override a scheduled CG communication for a higher priority communication, the BS may transmit CG cancellation DCI to the UE to temporarily cancel or deactivate one or more subsequent CG occasions 605 for the UE. The CG cancellation DCI may deactivate only a subsequent one CG occasion 605 or a subsequent N CG occasions 605 (where N is an integer). CG occasions 605 after the one or more (e.g., N) CG occasions 605 subsequent to the CG cancellation DCI may remain activated. Based at least in part on receiving the CG cancellation DCI, the UE may refrain from transmitting in the one or more (e.g., N) CG occasions 605 subsequent to receiving the CG cancellation DCI. As shown in example 600, the CG cancellation DCI cancels one subsequent CG occasion 605 for the UE. After the CG occasion 605 (or N CG occasions) subsequent to receiving the CG cancellation DCI, the UE may automatically resume transmission in the scheduled CG occasions 605.

The BS may transmit CG release DCI to the UE to deactivate the CG configuration for the UE. The UE may stop transmitting in the scheduled CG occasions 605 based at least in part on receiving the CG release DCI. For example, the UE may refrain from transmitting in any scheduled CG occasions 605 until another CG activation DCI is received from the BS. Whereas the CG cancellation DCI may deactivate only a subsequent one CG occasion 605 or a subsequent N CG occasions 605, the CG release DCI deactivates all subsequent CG occasions 605 for a given CG configuration for the UE until the given CG configuration is activated again by a new CG activation DCI.

Example 600 involves a Type 2 CG configuration, in which the BS may transmit CG activation DCIs to the UE. In Type 1 CG configurations, the BS may not transmit CG activation DCIs to the UE. For example, the CG may be active upon configuration and until reconfigured to be inactive or until deconfigured. Techniques described herein may be compatible with Type 1 and/or Type 2 CG configurations.

As indicated above, FIG. 6 is provided as an example. Other examples may differ from what is described with respect to FIG. 6.

Figure 7:
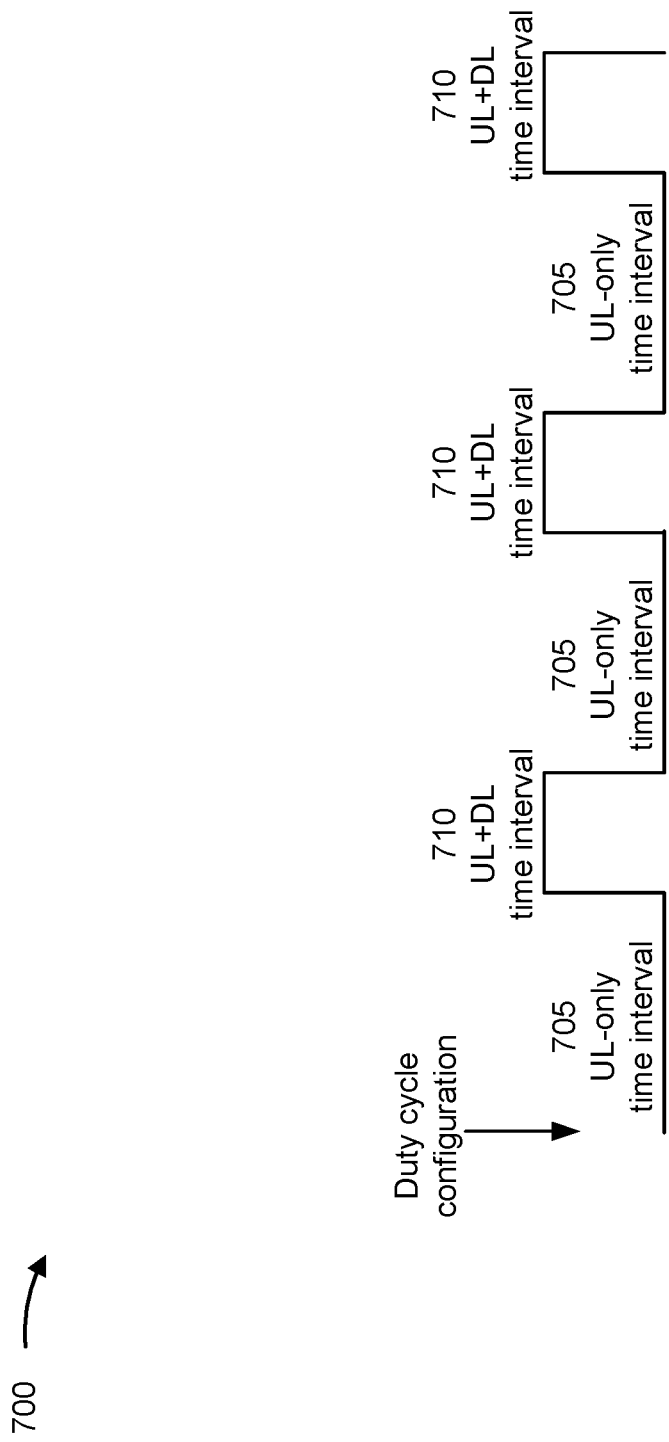
FIG. 7 is a diagram illustrating an example of a duty cycle configured to reduce energy consumption, in accordance with the present disclosure.

FIG. 7 is a diagram illustrating an example 700 of a duty cycle configured to reduce energy consumption, in accordance with the present disclosure. In some examples, the duty cycle may be implemented as a connected-mode discontinuous reception (CDRX) duty cycle. A UE and a BS may implement the duty cycle using On timers and Inactivity timers to transition between uplink-only (UL-only) time intervals 705 and uplink and downlink (UL+DL) time intervals 710. During the uplink-only time intervals 705, the UE may be configured to transmit uplink communications to the BS and the BS may not transmit (e.g., may be prohibited from transmitting) downlink communications to the UE. During the uplink and downlink time intervals 710, the BS may be configured to transmit downlink communications to the UE. Thus, the duty cycle may maintain uplink transmissions (e.g., during both the uplink-only time intervals 705 and the uplink and downlink time intervals 710) while minimizing downlink transmissions or condensing the downlink transmissions into specified durations (e.g., during the uplink and downlink time intervals 710).

By preventing the BS from transmitting downlink communications during the uplink-only time intervals 705, the duty cycle may offer potential energy savings for both the BS and the UE. For example, the UE may reduce the amount of time and energy spent monitoring for or receiving downlink communications during the uplink-only time intervals 705. Moreover, the BS may conserve energy on operations associated with downlink communications during the uplink-only time intervals 705. Thus, during the uplink-only time intervals 705, the UE and/or the BS may enter low-power states. During the uplink and downlink time intervals 710, the UE and/or BS may enter high-throughput or high-coverage states in which the UE and/or BS consume more energy than the low-power states.

The uplink-only time intervals 705 and uplink and downlink time intervals 710 may persist for any suitable lengths of time. The uplink-only time intervals 705 and uplink and downlink time intervals 710 may occur at preconfigured times and/or dynamically. For example, the uplink-only time intervals 705 and uplink and downlink time intervals 710 may occur at pre-set, regular (e.g., periodic) times. Alternatively, the BS may transmit, to the UE, a DCI that prompts the UE to dynamically transition to the uplink-only time intervals 705 or the uplink and downlink time intervals 710. In some examples, the duty cycle may include at least one preconfigured uplink-only time interval 705 or uplink and downlink time interval 710 and at least one uplink-only time interval 705 or uplink and downlink time interval 710 that is dynamic.

As mentioned, the duty cycle may be implemented as a CDRX cycle, such as via a discontinuous reception (DRX) configuration. In some examples, the duty cycle may be implemented using a combination of a CDRX cycle and another cycle, such as a discontinuous transmission (DTX) cycle at the BS, a DRX cycle at the BS, or a set of NES states (NES states are described above). A DTX cycle may indicate periods (e.g., uplink-only time intervals 705) in which the BS is not permitted or expected to transmit downlink communications. The techniques described herein can be applied for any form of duty cycle, whether the duty cycle is implemented as a CDRX cycle, a DTX cycle, a DRX cycle, a set of NES states, a combination thereof, or as a different type of cycle. Furthermore, the techniques described herein can be implemented for a combination of uplink-only time intervals 705 and uplink and downlink time intervals 710 that are implemented as individual time intervals, as opposed to being implemented as part of a recurring cycle.

As indicated above, FIG. 7 is provided as an example. Other examples may differ from what is described with respect to FIG. 7.

Figure 8:
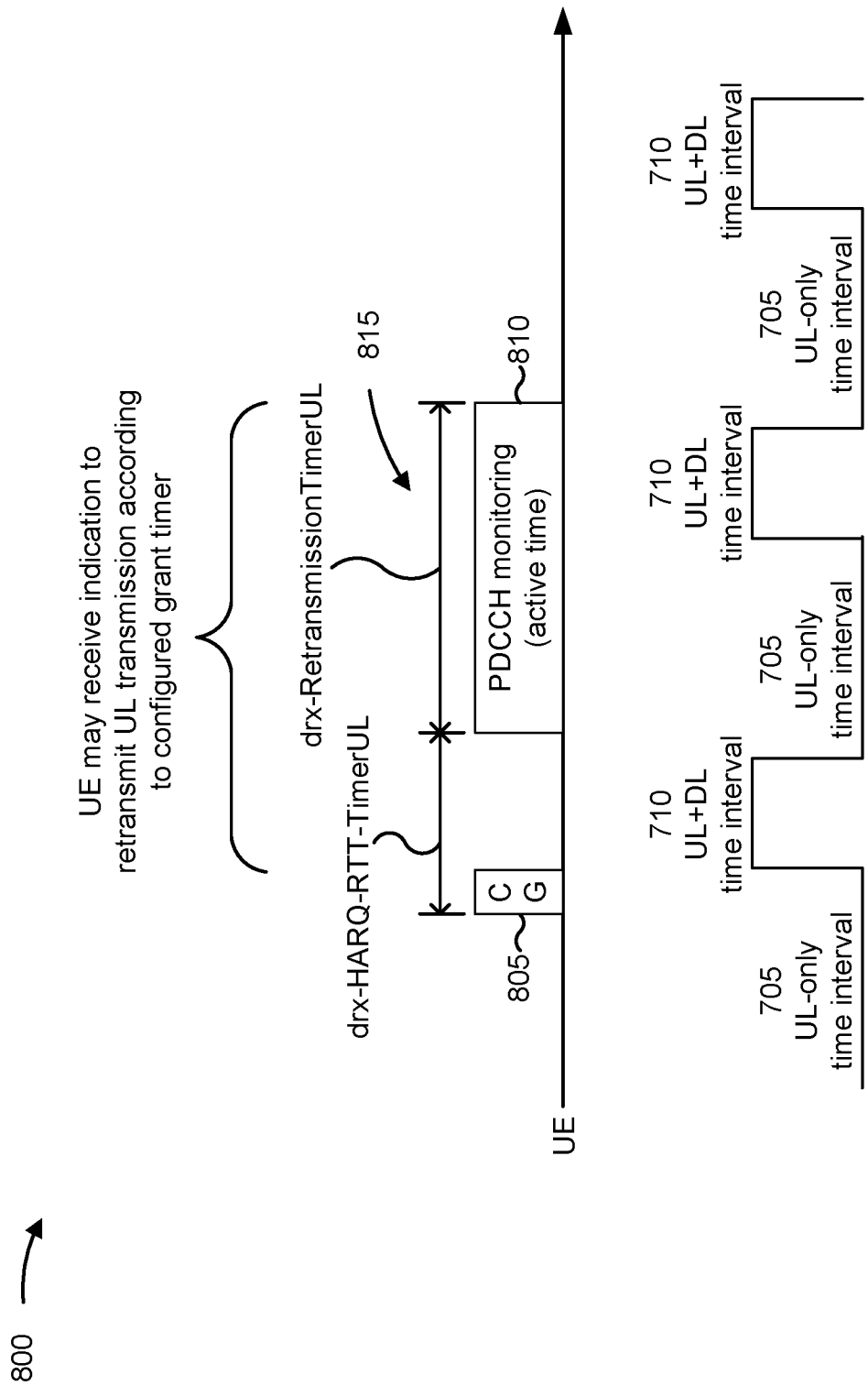
FIG. 8 is a diagram illustrating an example of CG retransmission operations that occur during a duty cycle, in accordance with the present disclosure.

FIG. 8 is a diagram illustrating an example 800 of CG retransmission operations that occur during a duty cycle, in accordance with the present disclosure. When a UE transmits an uplink CG transmission to a BS, the UE may not receive an explicit acknowledgment regarding the uplink CG transmission (e.g., HARQ-ACK feedback) from the BS. Instead, the UE may await a retransmission indication from the BS during a time window defined by a CG timer (which may be defined by the CG configuration of the uplink CG transmission). The time window may start at the transmission of the CG transmission and restart when the UE receives a retransmission indication (if any). Upon obtaining the retransmission indication within the time window, the UE may retransmit the CG transmission to the BS (e.g., with the same HARQ process ID as the original uplink CG transmission). Or, if the UE does not obtain the retransmission indication within the time window, the UE may refrain from retransmitting the CG transmission to the BS. The UE not receiving the retransmission indication from the BS within the time window may serve as an implicit indication to the UE that the BS received the CG transmission.

As shown in FIG. 8, the UE may transmit a CG transmission 805 to a BS. When the UE transmits the CG transmission 805, the UE may start a round-trip timer (e.g., a drx-HARQ-RTT-TimerUL timer). The round-trip timer may be defined, for example, by a DRX configuration, such as a CDRX configuration. When the drx-HARQ-RTT-TimerUL timer expires, the UE may begin monitoring for a retransmission indication from the BS. The drx-HARQ-RTT-TimerUL timer may be configured for any suitable length of time. For example, the drx-HARQ-RTT-TimerUL timer may be based on an expected time for the BS to determine that the CG transmission 805 was unsuccessful and transmit a retransmission indication to the UE, which may include propagation delays from the UE to the BS and from the BS to the UE. In some cases, the length of the drx-HARQ-RTT-TimerUL timer may extend beyond the minimum expected time for the BS to determine that the CG transmission 805 was unsuccessful and transmit a retransmission indication. For example, the UE may remain in a low-power state for an extended duration of the drx-HARQ-RTT-TimerUL timer.

Once the drx-HARQ-RTT-TimerUL timer expires, the UE may start a retransmission timer (e.g., a drx-RetransmissionTimerUL timer). The drx-RetransmissionTimerUL timer may indicate a length of time during which the UE may receive the retransmission indication from the BS, and may be defined, for example, by a DRX configuration, such as a CDRX configuration. During the length of time defined by the drx-RetransmissionTimerUL timer, the UE may actively monitor for PDCCH communications (e.g., a retransmission indication) from the BS during a time window 810. In some aspects, a configuration of the drx-RetransmissionTimerUL timer may define a time window 815 based at least in part on the drx-RetransmissionTimerUL timer. For example, the time window 815 may be the same length of time as the drx-RetransmissionTimerUL timer. The UE may use more energy resources (e.g., battery power) when actively monitoring for PDCCH communications (e.g., during the drx-RetransmissionTimerUL timer) than when the UE is in a low-power state (e.g., during the drx-HARQ-RTT-TimerUL timer).

Thus, the retransmission of a CG transmission may depend on timers that control when the UE may monitor for downlink retransmission indications. However, the duty cycle may create issues with managing retransmissions because the duty cycle may prohibit downlink transmissions during this timer activity. In example 800, the drx-RetransmissionTimerUL timer extends over a first uplink-only time interval 705, an uplink and downlink time interval 710, and a second uplink-only time interval 705. As a result, the UE actively monitors for the retransmission indication during the first uplink-only time interval 705, the uplink and downlink time interval 710, and the second uplink-only time interval 705. In this case, the UE may use energy resources (e.g., battery power) to actively monitor for PDCCH transmissions (e.g., the retransmission indication) during uplink-only time intervals 705 in which the BS may be prohibited from providing PDCCH transmissions to the UE.

In another example, the drx-RetransmissionTimerUL timer may not overlap with any uplink and downlink time intervals 710. In this example, the BS may not provide any retransmission indication to the UE and, as a result, may never receive the CG transmission from the UE. Although the duty cycle may prevent the BS from receiving the CG transmission from the UE, overriding the uplink-only time intervals 705 of the duty cycle to enable the BS to provide the retransmission indication would also reduce or eliminate the NES conferred by the duty cycle for the UE and the BS. Some techniques described herein provide configuration of the time window in which the UE monitors for the indication to retransmit the CG configuration based at least in part on the time uplink and downlink time intervals 710, as described in more detail below. In some aspects, the UE and/or BS may adapt the retransmission timer based on the duty cycle to manage CG retransmission operations.

As indicated above, FIG. 8 is provided as an example. Other examples may differ from what is described with respect to FIG. 8.

Figure 9:
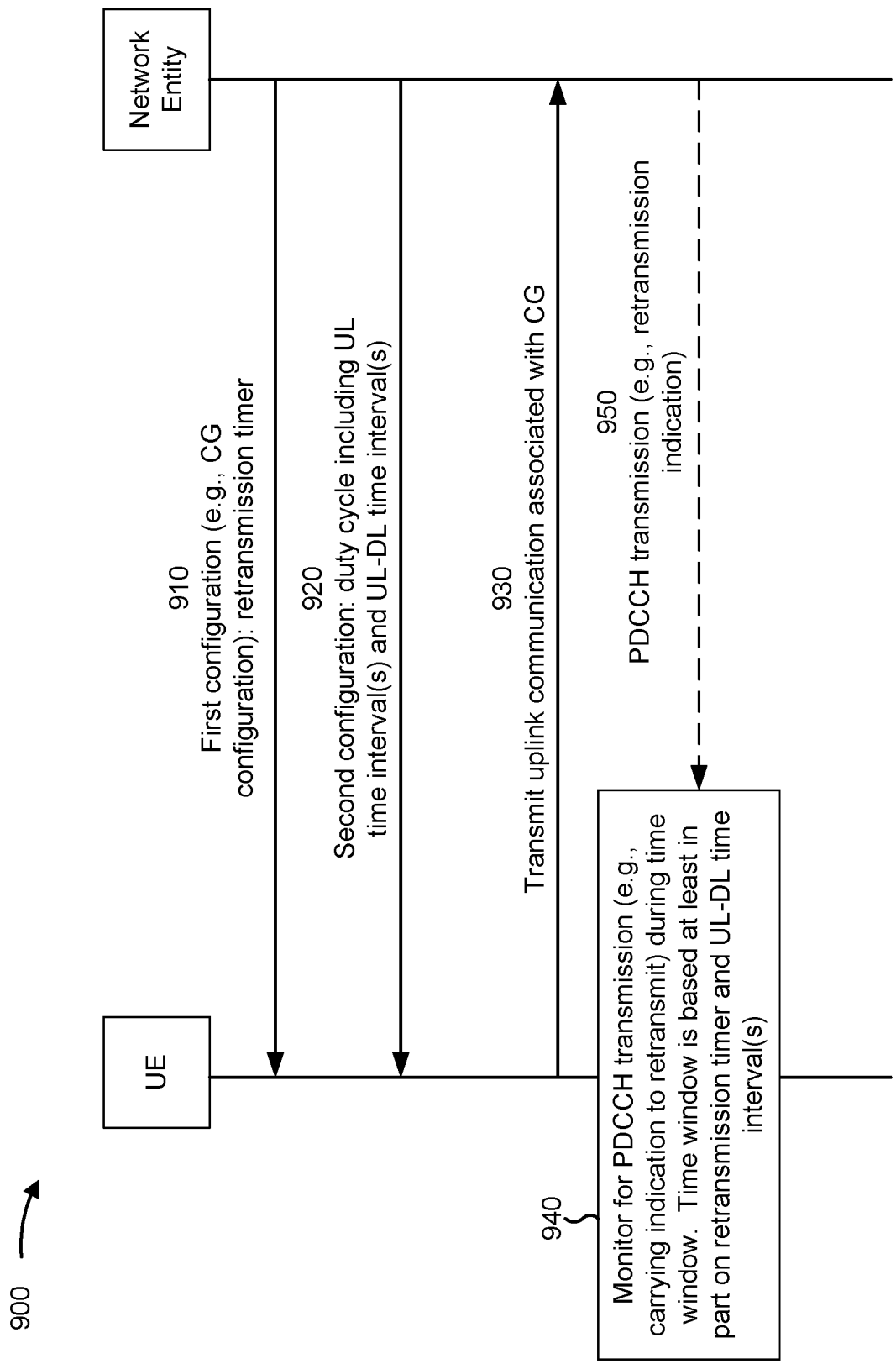
FIG. 9 is a diagram illustrating an example of configuration operations to control a time window during which a UE monitors for a physical downlink control channel (PDCCH) transmission based at least in part on a time interval for at least downlink communication, in accordance with various aspects of the present disclosure.

FIG. 9 is a diagram illustrating an example 900 of configuration operations to control a time window during which a UE monitors for a PDCCH transmission based at least in part on a time interval for at least downlink communication, in accordance with various aspects of the present disclosure. As shown in FIG. 9, a UE (e.g., a UE 120) may be configured to communicate with a network entity (e.g., a BS 110 and/or another network entity).

As used herein, the network entity "outputting" or "transmitting" a communication to the UE may refer to a direct transmission (for example, from the network entity to the UE) or an indirect transmission via one or more other network nodes or devices. For example, if the network entity is a DU, an indirect transmission to the UE may include the DU transmitting or outputting a communication to an RU and the RU transmitting the communication to the UE, or may include causing the RU to transmit the communication (e.g., triggering transmission of a physical layer reference signal). Similarly, the UE "transmitting" a communication to the network entity may refer to a direct transmission (for example, from the UE to the network entity) or an indirect transmission via one or more other network nodes or devices. For example, if the network entity is a DU, an indirect transmission to the network entity may include the UE transmitting a communication to an RU and the RU transmitting the communication to the DU. Similarly, the network entity "obtaining" a communication may refer to receiving a transmission carrying the communication directly (for example, from the UE to the network entity) or receiving the communication (or information derived from reception of the communication) via one or more other network nodes or devices.

As shown in FIG. 9, and by reference number 910, the network entity may output (e.g., transmit), and the UE may receive, a first configuration of a retransmission timer. The first configuration may be communicated via RRC signaling, MAC control element (MAC-CE) signaling, and/or DCI signaling, among other examples. In some aspects, the first configuration may include a CG configuration of a CG (e.g., a ConfiguredGrantConfig RRC configuration), similar to the CG configuration depicted and described in connection with FIG. 6. For example, the CG configuration may include a configuredGrantTimer configuration. A configuredGrantTimer may indicate the initial value of a CG timer that denotes a length of time during which the UE may receive an indication to retransmit an uplink CG transmission. The configuredGrantTimer may indicate the initial value of the CG time in multiples of periodicity. When a cg-RetransmissionTimer is configured, if HARQ processes are shared among different CGs on the same bandwidth part (BWP), then the periodicity of the configuredGrantTimer may be set to a value associated with the configurations that share the HARQ processes.

In some aspects, the first configuration may include information associated with a retransmission of an uplink communication associated with a CG (e.g., a retransmission of a CG uplink communication). The retransmission timer may be associated with, or may be, a drx-RetransmissionTimerUL timer. The drx-RetransmissionTimerUL timer may be defined, for example, by a DRX configuration, such as a CDRX configuration. The first configuration of the retransmission timer may indicate a length of time for the UE to receive, from the network entity, a PDCCH transmission, such as a PDCCH transmission for retransmission of the uplink communication associated with the CG.

As shown by reference number 920, the network entity may output (e.g., transmit), and the UE may receive, a second configuration of a first time interval for uplink communication and a second time interval for at least downlink communication. The first time interval for uplink communication may be a time interval for uplink-only communication (e.g., during which only uplink communications are permitted). The second time interval may be a time interval for both uplink and downlink communication (e.g., an UL-DL time interval). The second configuration may be communicated via RRC signaling, MAC-CE signaling, and/or DCI signaling, among other examples.

In some aspects, the second configuration may be a configuration of a cycle (e.g., a duty cycle) that includes the first time interval and the second time interval. For example, the cycle may be similar to the cycle depicted and described in connection with FIGS. 7 and 8. In some aspects, the configuration of the cycle may include a CDRX configuration, a configuration of a pattern of NES states, a network DRX configuration, and/or a network DTX configuration, among other examples. The duty cycle may offer potential energy savings for both the network entity and the UE by preventing the network entity from transmitting downlink communications during the first time interval for uplink communication.

As shown by reference number 930, the UE may transmit, and the network entity may obtain (e.g., receive), an uplink communication associated with the CG. The uplink communication may be a PUSCH communication, or a PUCCH communication, among other examples. For example, the UE may use resources (e.g., time domain resources, frequency domain resources, code domain resources, and/or spatial domain resources) indicated by the first configuration (e.g., a CG configuration) to transmit the uplink communication. The UE may transmit the uplink communication without receiving, from the network entity, a dedicated DCI to schedule the uplink communication, thereby conserving signaling overhead.

As shown by reference number 940, the UE may monitor for a PDCCH transmission during a time window based at least in part on the retransmission timer. The PDCCH transmission may be a PDCCH transmission for retransmission of the uplink communication associated with the CG. For example, the PDCCH transmission may include a communication or message that requests or triggers the UE to transmit a retransmission of the uplink communication. In some aspects, the time window may be based at least in part on the second time interval for at least downlink communication. For example, the time window may be adapted to overlap or align, in the time domain, with the second time interval for at least downlink communication. For example, the UE and/or network entity may change an initial configuration (e.g., an initial location in the time domain) of the time window to an updated configuration (e.g., an updated location in the time domain) of the time window, where the updated configuration causes the time window to overlap or align with the second time interval for at least downlink communication. Basing the time window at least in part on the second time interval for at least downlink communication may allow the first time interval for uplink communication to persist while ensuring that the UE may reliably receive retransmission indications from a network entity. Thus, the UE may benefit from the NES (e.g., battery power savings) conferred by the first time interval for uplink communication with minimal uplink communications lost.

As discussed in greater detail below with reference to FIG. 10, in some aspects, the time window during which the UE may monitor for the PDCCH transmission may be fully overlapped with the second time interval for at least downlink communication. Fully overlapping the time window with the second time interval for at least downlink communication may permit the UE to monitor for downlink communications during only the second time interval. As a result, the UE may conserve energy (e.g., battery power) by avoiding unnecessary monitoring of downlink communications during the first time interval for uplink communication.

As discussed in greater detail below with reference to FIGS. 11 and 12, in some aspects, a first start of the time window during which the UE may monitor for the PDCCH transmission may be aligned, in the time domain, with a second start of the second time interval for at least downlink communication. In some examples, the alignment may cause the time window to overlap with one or more additional time intervals for at least downlink communication (e.g., where the additional time intervals are after the time interval for at least downlink communication). The additional time intervals may offer the network entity further opportunities to provide any PDCCH transmission, such as a retransmission indication. In some examples, the alignment may provide increased flexibility with respect to when the network entity may output, and the UE may receive, a retransmission indication.

In some aspects, the network entity may configure the time window to align or overlap with the time interval for at least downlink communication. For example, the network entity may provide, to the UE, an indication of how to adapt (e.g., align or overlap) the time window. In some aspects, the UE may autonomously configure the time window to align or overlap with the time interval for at least downlink communication.

As shown by reference number 950, the network entity may output (e.g., transmit), and the UE may receive, a PDCCH transmission. For example, the PDCCH transmission may be for retransmission of the uplink communication associated with the CG. The UE may receive the PDCCH transmission during the time window in which the UE may monitor for the PDCCH transmission. Upon receiving the PDCCH transmission, the UE may retransmit the uplink communication associated with the CG, which may enable the network entity to receive the uplink communication in case the transmission of the uplink communication discussed in relation to reference number 930 was unsuccessful. If the transmission of the uplink communication discussed in relation to reference number 930 was successful, then the network entity may refrain from outputting the PDCCH transmission.

As indicated above, FIG. 9 is provided as an example. Other examples may differ from what is described with respect to FIG. 9.

Figure 10:
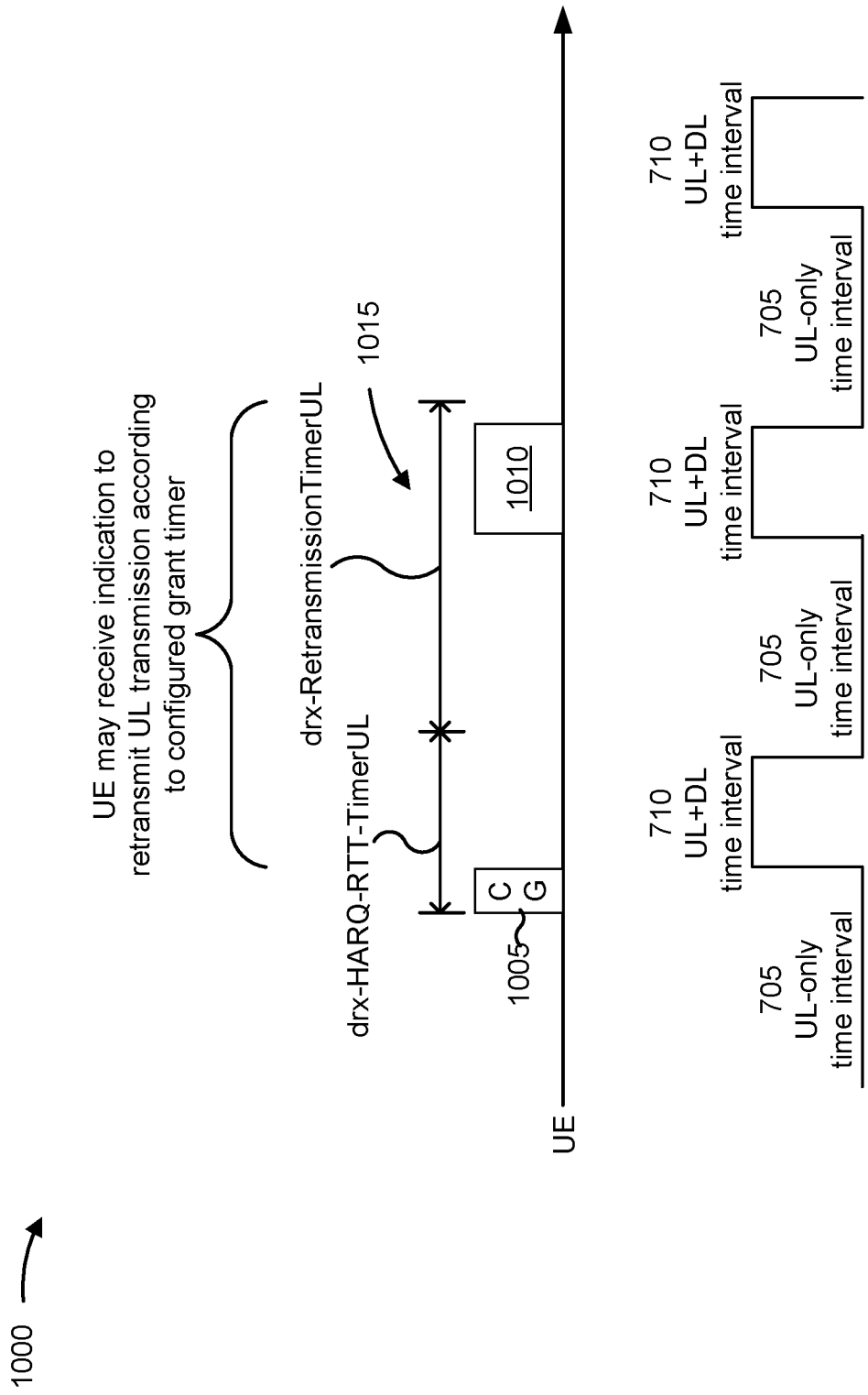
FIG. 10 is a diagram illustrating an example of CG retransmission operations that may configure a UE to monitor for a PDCCH transmission during a time window that is fully overlapped with a time interval for at least downlink communication, in accordance with various aspects of the present disclosure.
Figure 11:
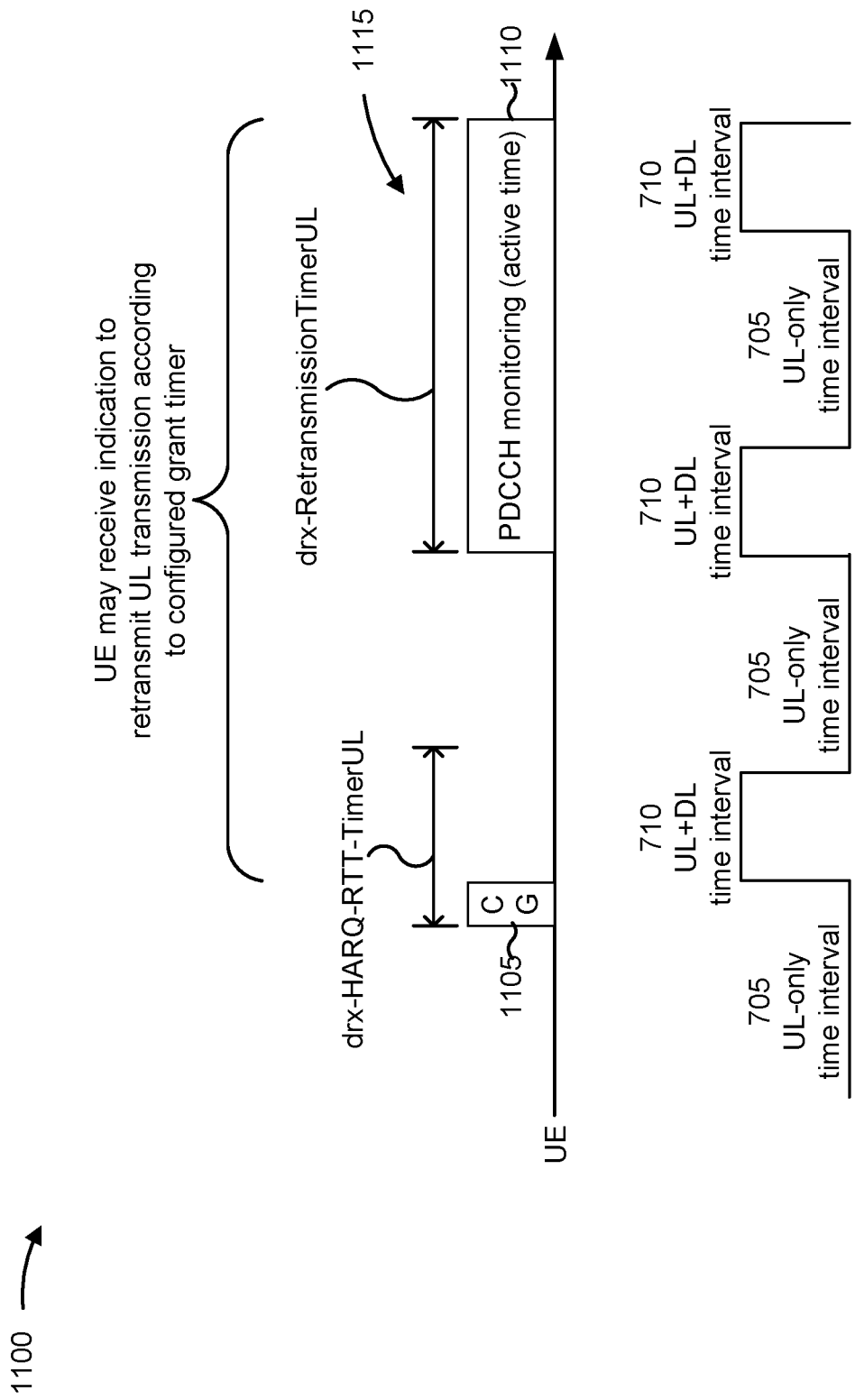
FIG. 11 is a diagram illustrating an example of CG retransmission operations that may configure a UE to monitor for a PDCCH transmission during a time window the start of which is aligned with a start of a time interval for at least downlink communications, in accordance with various aspects of the present disclosure.
Figure 12:
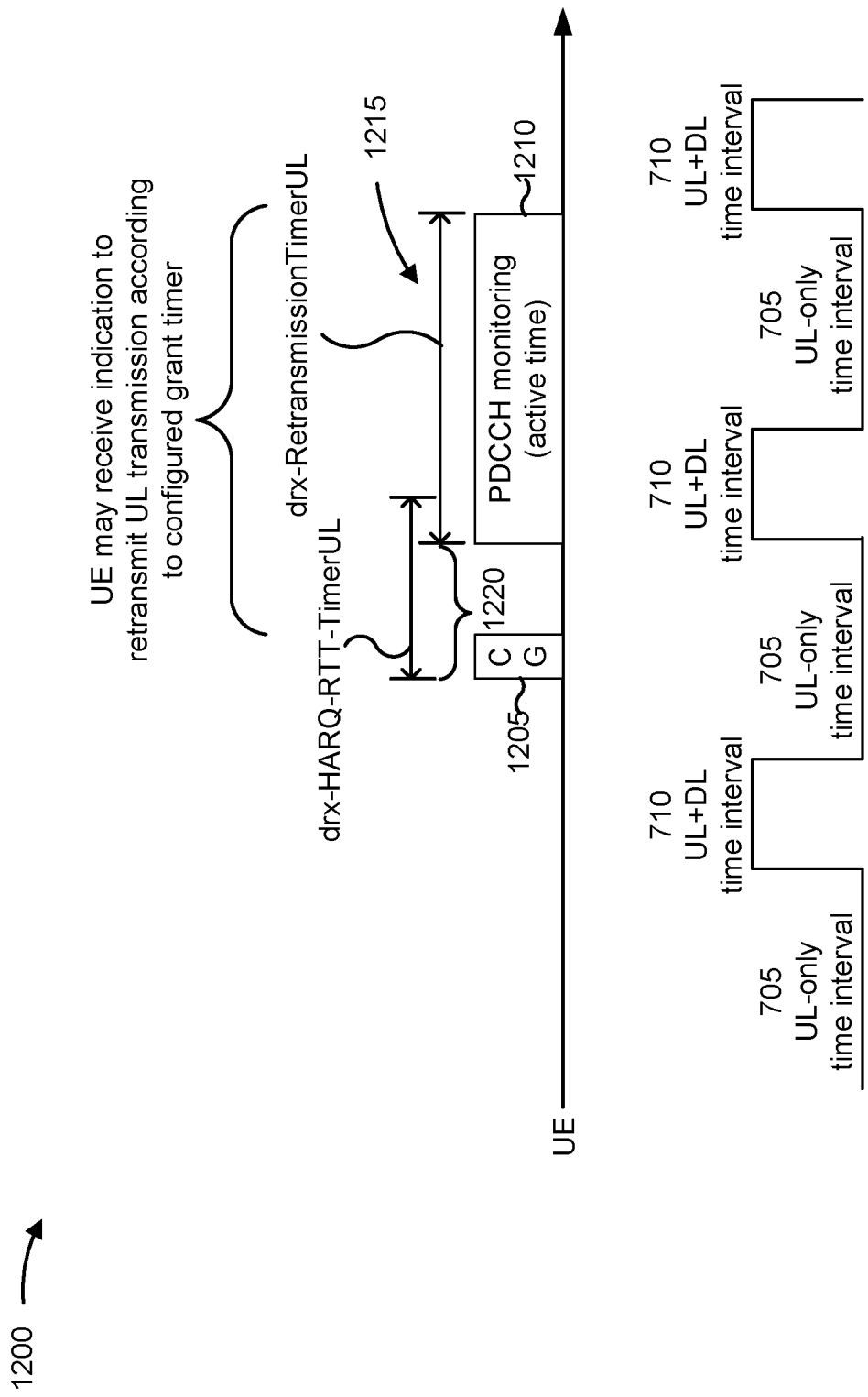
FIG. 12 is a diagram illustrating an example of CG retransmission operations that may configure a UE to monitor for a PDCCH transmission during a time window the start of which is aligned with a start of a time interval for at least downlink communications, in accordance with various aspects of the present disclosure.

FIGS. 10-12 illustrate respective examples for configuring a time window during which a UE may monitor for a PDCCH transmission, as discussed above in relation to reference number 940. In example 1000 (FIG. 10), the time window is fully overlapped with a time interval for at least downlink communication. In example 1100 (FIG. 11) and example 1200 (FIG. 12), the start of the time window may be aligned with a start of the time interval for at least downlink communication. For example, the start of the time window and the start of the time interval for at least downlink communication may occur at the same time or may occur at different times where the difference between the times is below a threshold value. In some examples (e.g., example 1100), the alignment may cause the time window to overlap with one or more additional time intervals for at least downlink communication (e.g., where the additional time intervals follow the time interval for at least downlink communication). The additional time intervals may offer the network entity further opportunities to provide any PDCCH transmission, such as a retransmission indication. In some examples (e.g., example 1200), the alignment may provide increased flexibility with respect to when the network entity may send a retransmission indication. Each of FIGS. 10-12 will be discussed in turn as follows.

FIG. 10 is a diagram illustrating an example 1000 of CG retransmission operations that may configure a UE to monitor for a PDCCH transmission during a time window that is fully overlapped with a time interval for at least downlink communication, in accordance with the present disclosure. As shown in FIG. 10, the UE may transmit an uplink communication (e.g., a CG transmission 1005) to a network entity. Upon transmitting the CG transmission 1005, the UE may start or initiate a round-trip timer (e.g., a drx-HARQ-RTT-TimerUL timer). After the drx-HARQ-RTT-TimerUL timer expires, the UE may begin monitoring for a retransmission indication from the network entity. For example, the UE may start a retransmission timer (e.g., a drx-RetransmissionTimerUL timer) that may indicate a length of time for the UE to receive the retransmission indication from the network entity (e.g., an amount of time that the UE is to monitor a PDCCH for the retransmission indication).

As shown in FIG. 10, the UE may be configured with one or more uplink-only time intervals 705 and one or more uplink and downlink time intervals 710. An uplink-only time intervals 705 may be similar to the first time interval described above in connection with FIG. 9. An uplink and downlink time interval 710 may be similar to the second time interval described above in connection with FIG. 9. For example, the one or more uplink-only time intervals 705 and the one or more uplink and downlink time intervals 710 may be associated with a duty cycle, such as a DRX cycle or a CDRX cycle, among other examples.

The UE may actively monitor for PDCCH communications (e.g., a retransmission indication) from the network entity during a time window 1010 that is fully overlapped with a time interval for at least downlink communication (e.g., an uplink and downlink time interval 710). In some aspects, a configuration of the drx-RetransmissionTimerUL timer may define a time window 1015 based at least in part on the drx-RetransmissionTimerUL timer. For example, the time window 1015 may be the same length of time as the drx-RetransmissionTimerUL timer. As shown in FIG. 10, the time window 1010 may be different from the time window 1015. For example, unlike time window 1010 (which is fully overlapped with the uplink and downlink time interval 710), the time window 1015 may be at least partially non-overlapped with the uplink and downlink time interval 710 (e.g., because the time window 1015 extends over an uplink-only time interval 705). Thus, the UE may adapt the time window 1010 to fully overlap with the uplink and downlink time interval 710 (e.g., by reducing the time window 1010 relative to the time window 1015 defined by the drx-RetransmissionTimerUL timer). In other words, the UE may only actively monitor the PDCCH during the time window 1010. During a remaining duration of the drx-RetransmissionTimerUL timer, the UE may refrain from (e.g., may not) actively monitor the PDCCH. If the time window 1010 is already fully overlapped with the uplink and downlink time interval 710 before the UE adapts the time window 1010, then the UE may allow the time window 1010 to remain fully overlapped with the uplink and downlink time interval 710 (e.g., the UE may not modify or adapt the time window 1010 in such examples). In other words, if the drx-RetransmissionTimerUL is already fully overlapped in the time domain with the uplink and downlink time interval 710 before the UE adapts the time window 1010, then no changes may be made and the UE may monitor the PDCCH during the amount of time associated with the drx-RetransmissionTimerUL timer. Alternatively, if the drx-RetransmissionTimerUL is not overlapped, or is partially overlapped, in the time domain with the uplink and downlink time interval 710, then the UE may adapt the time window 1010 as described above (e.g., if the overlap between the drx-RetransmissionTimerUL and the uplink and downlink time interval 710 is partial, then the UE may adapt the interval of PDCCH monitoring to only the overlap with the uplink and downlink time interval 710).

Fully overlapping the time window 1010 with the uplink and downlink time interval 710 may permit the UE to monitor for downlink communications during only the uplink and downlink time interval 710. For example, the UE may avoid actively monitoring for PDCCH communications during the entirety of the time window 1015. As a result, the UE conserves energy (e.g., battery power) by avoiding unnecessary monitoring of downlink communications during the uplink-only time interval 705.

As indicated above, FIG. 10 is provided as an example. Other examples may differ from what is described with respect to FIG. 10.

FIG. 11 is a diagram illustrating an example 1100 of CG retransmission operations that may configure a UE to monitor for a PDCCH transmission during a time window the start of which is aligned with a start of a time interval for at least downlink communications, in accordance with the present disclosure. As shown in FIG. 11, the UE may transmit an uplink communication (e.g., a CG transmission 1105) to a network entity. Upon transmitting the CG transmission 1105, the UE may start a round-trip timer (e.g., a drx-HARQ-RTT-TimerUL timer). After the drx-HARQ-RTT-TimerUL timer expires, the UE may begin monitoring for a retransmission indication from the network entity. For example, the UE may start a retransmission timer (e.g., a drx-RetransmissionTimerUL timer) that may indicate a length of time for the UE to receive the retransmission indication from the network entity. In a similar manner as described in more detail elsewhere herein, the UE may be configured with one or more uplink-only time intervals 705 and one or more uplink and downlink time intervals 710.

The UE may actively monitor for PDCCH communications (e.g., a retransmission indication) from the network entity during a time window 1110. The start of the time window 1110 may be aligned with a start of an uplink and downlink time interval 710. For example, the uplink and downlink time interval 710 may be the first uplink and downlink time interval 710 after the expiration of the drx-HARQ-RTT-TimerUL timer. In some aspects, a configuration of the retransmission timer may define a time window 1115 based at least in part on the retransmission timer (e.g., the drx-RetransmissionTimerUL timer). For example, the time window 1115 may be the same length of time as the retransmission timer. In some aspects, the UE and/or network entity may determine that the start of the time window 1115 is not aligned with the start of the uplink and downlink time interval 710, or that the time window 1115 overlaps with the uplink and downlink time interval 710 by less than a threshold amount of time. In some examples, the network entity may output, and the UE may obtain, information indicating the threshold amount of time. For instance, the threshold amount of time may be an RRC-configured threshold amount of time. In some examples, the threshold amount of time may be configured in an original equipment manufacturer (OEM) configuration. In such examples, the threshold amount of time may not be exchanged between the UE and network entity.

Based on the start of the time window 1115 not aligning with the start of the uplink and downlink time interval 710, and/or the time window 1115 overlapping with the uplink and downlink time interval 710 by less than a threshold amount of time, the start of the time window 1110 may be aligned with the start of the uplink and downlink time interval 710 (e.g., by the UE). In some aspects, the start of the time window 1115 may also be aligned with the start of the uplink and downlink time interval 710, as shown in FIG. 11. In some aspects, the round-trip timer may be extended to expire at the start of the uplink and downlink time interval 710 that is aligned with the start of the time window 1115.

In some examples, the time window 1110 may overlap with one or more additional uplink and downlink time intervals 710 (e.g., with one or more additional time intervals for at least downlink communication). For instance, the time window 1110 may overlap with at least one subsequent uplink and downlink time interval 710. The additional time intervals may offer the network entity further opportunities to provide any PDCCH transmissions, such as a retransmission indication. In some aspects, the UE may adjust (e.g., shorten or extend) the length of the time window 1110 so that the time window 1110 overlaps with at least one subsequent uplink and downlink time interval 710. For example, the UE may shorten the length of the time window 1110, which may limit the time during which the UE is monitoring for a PDCCH transmission during uplink-only time intervals 705 (e.g., while maintaining an overlap of the time window 1110 and at least one additional uplink and downlink time interval 710). Alternatively, the UE may increase the length of the time window 1110, which may cause the time window 1110 to overlap with one or more of the additional uplink and downlink time intervals 710.

As indicated above, FIG. 11 is provided as an example. Other examples may differ from what is described with respect to FIG. 11.

FIG. 12 is a diagram illustrating an example 1200 of CG retransmission operations that may configure a UE to monitor for a PDCCH transmission during a time window the start of which is aligned with a start of a time interval for at least downlink communications, in accordance with the present disclosure. As shown in FIG. 12, the UE may transmit an uplink communication (e.g., a CG transmission 1205) to a network entity. When the UE transmits the CG transmission 1205, the UE may start a round-trip timer (e.g., a drx-HARQ-RTT-TimerUL timer). A retransmission timer (e.g., a drx-RetransmissionTimerUL timer) may indicate a length of time for the UE to receive the retransmission indication from the network entity. In some aspects, a configuration of the retransmission timer may indicate the round-trip timer, which may be associated with the retransmission timer. For example, the round-trip timer may indicate a default length of time between transmission of the CG transmission and a start of the time window defined by the retransmission timer. In a similar manner as described in more detail elsewhere herein, the UE may be configured with one or more uplink-only time intervals 705 and one or more uplink and downlink time intervals 710.

The UE may actively monitor for PDCCH communications (e.g., a retransmission indication) from the network entity during a time window 1210. The start of time window 1210 may be aligned with a start of the uplink and downlink time interval 710. In some aspects, a configuration of the retransmission timer may define a time window 1215 based at least in part on the retransmission timer (e.g., the drx-RetransmissionTimerUL timer). For example, the time window 1215 may be the same length of time as the retransmission timer.

In some aspects, the UE may transmit the CG transmission within a length (e.g., an amount of time) 1220 of the round-trip timer from the start of the uplink and downlink time interval 710. The time window 1210 may be aligned with the start of the uplink and downlink time interval 710 based at least in part on the CG transmission being transmitted within the length 1220. For example, as shown in FIG. 12, the UE may begin monitoring for PDCCH transmissions during the time window 1210 before the round-trip timer has expired. In some aspects, if the CG transmission occurs before the uplink and downlink time interval 710 by less than the length of the round-trip timer, then the UE may adapt the start of the time window 1210 to align with the start of the uplink and downlink time interval 710. In some examples, the length 1220 (e.g., a minimum length of the length 1220) may be configured. The timer for this monitoring occasion can be configured separately for this case.

Permitting the UE to begin monitoring for PDCCH transmissions before the round-trip timer has expired—instead of waiting until after the round-trip timer has expired—may provide increased flexibility with respect to when the network entity may send a retransmission indication. In some aspects, the network entity may send the retransmission indication at or near the start of the uplink and downlink time interval 710, even though the round-trip timer has not yet expired. As a result, the UE may have more opportunities to provide CG transmissions (e.g., a low-priority CG transmissions) to the network entity successfully. In some examples, allowing the network entity to send the retransmission indication before the round-trip timer expires may enable the network entity to send multiple retransmission indications for multiple CG transmissions. In some aspects, the UE may further increase flexibility with respect to when the network entity may send a retransmission indication by shortening or increasing the length of the time window 1210.

As indicated above, FIG. 12 is provided as an example. Other examples may differ from what is described with respect to FIG. 12.

Figure 13:
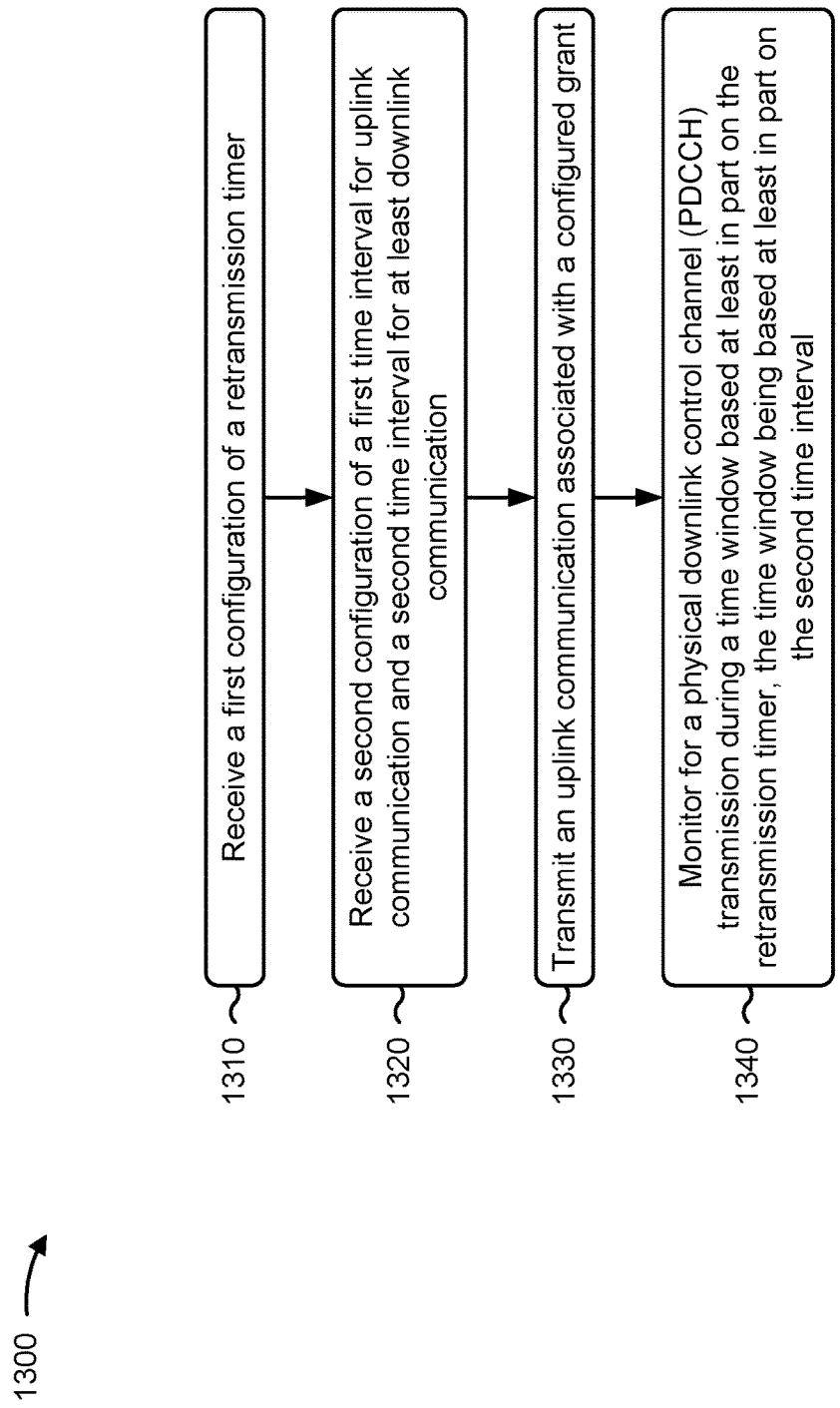
FIG. 13 shows a method for wireless communications by a UE, in accordance with the present disclosure.

FIG. 13 shows a method 1300 for wireless communications by a UE, such as UE 120.

Method 1300 begins at step 1310 with receiving a first configuration of a retransmission timer.

Method 1300 then proceeds to step 1320 with receiving a second configuration of a first time interval for uplink communication and a second time interval for at least downlink communication.

Method 1300 then proceeds to step 1330 with transmitting an uplink communication associated with a configured grant.

Method 1300 then proceeds to step 1340 with monitoring for a PDCCH transmission during a time window based at least in part on the retransmission timer, the time window being based at least in part on the second time interval.

In a first aspect, the time window is a first time window and the first configuration defines a second time window based at least in part on the retransmission timer.

In a second aspect, alone or in combination with the first aspect, the first time window is different from the second time window.

In a third aspect, alone or in combination with one or more of the first and second aspects, the first configuration further includes a configured grant configuration of the configured grant.

In a fourth aspect, alone or in combination with one or more of the first through third aspects, the second configuration comprises at least one of a connected-mode discontinuous reception configuration, a configuration of a pattern of network energy saving states, a network discontinuous reception configuration, a network discontinuous transmission configuration, or a combination thereof.

In a fifth aspect, alone or in combination with one or more of the first through fourth aspects, the time window is fully overlapped with the second time interval.

In a sixth aspect, alone or in combination with one or more of the first through fifth aspects, the time window is a first time window, the first configuration defines a second time window based at least in part on the retransmission timer, and the second time window is at least partially non-overlapped with the second time interval.

In a seventh aspect, alone or in combination with one or more of the first through sixth aspects, a first start of the time window is aligned with a second start of the second time interval.

In an eighth aspect, alone or in combination with one or more of the first through seventh aspects, the time window is a first time window, the first configuration defines a second time window based at least in part on the retransmission timer, and a third start of the second time window is not aligned with the second start of the second time interval.

In a ninth aspect, alone or in combination with one or more of the first through eighth aspects, the time window is a first time window, the first configuration defines a second time window based at least in part on the retransmission timer, and the first start of the first time window is aligned with the second start of the second time interval based at least in part on the second time window overlapping with the second time interval by less than a threshold amount of time.

In a tenth aspect, alone or in combination with one or more of the first through ninth aspects, method 1300 includes receiving information indicating the threshold amount of time.

In an eleventh aspect, alone or in combination with one or more of the first through tenth aspects, the first configuration indicates a round-trip timer associated with the retransmission timer, wherein transmitting the uplink communication further comprises transmitting the uplink communication within a length of the round-trip timer from the second start of the second time interval, and wherein the time window is aligned with the second start of the second time interval based at least in part on the uplink communication being transmitted within the length of the round-trip timer from the second start of the second time interval.

In a twelfth aspect, alone or in combination with one or more of the first through eleventh aspects, the PDCCH transmission is for retransmission of the uplink communication.

Figure 15:
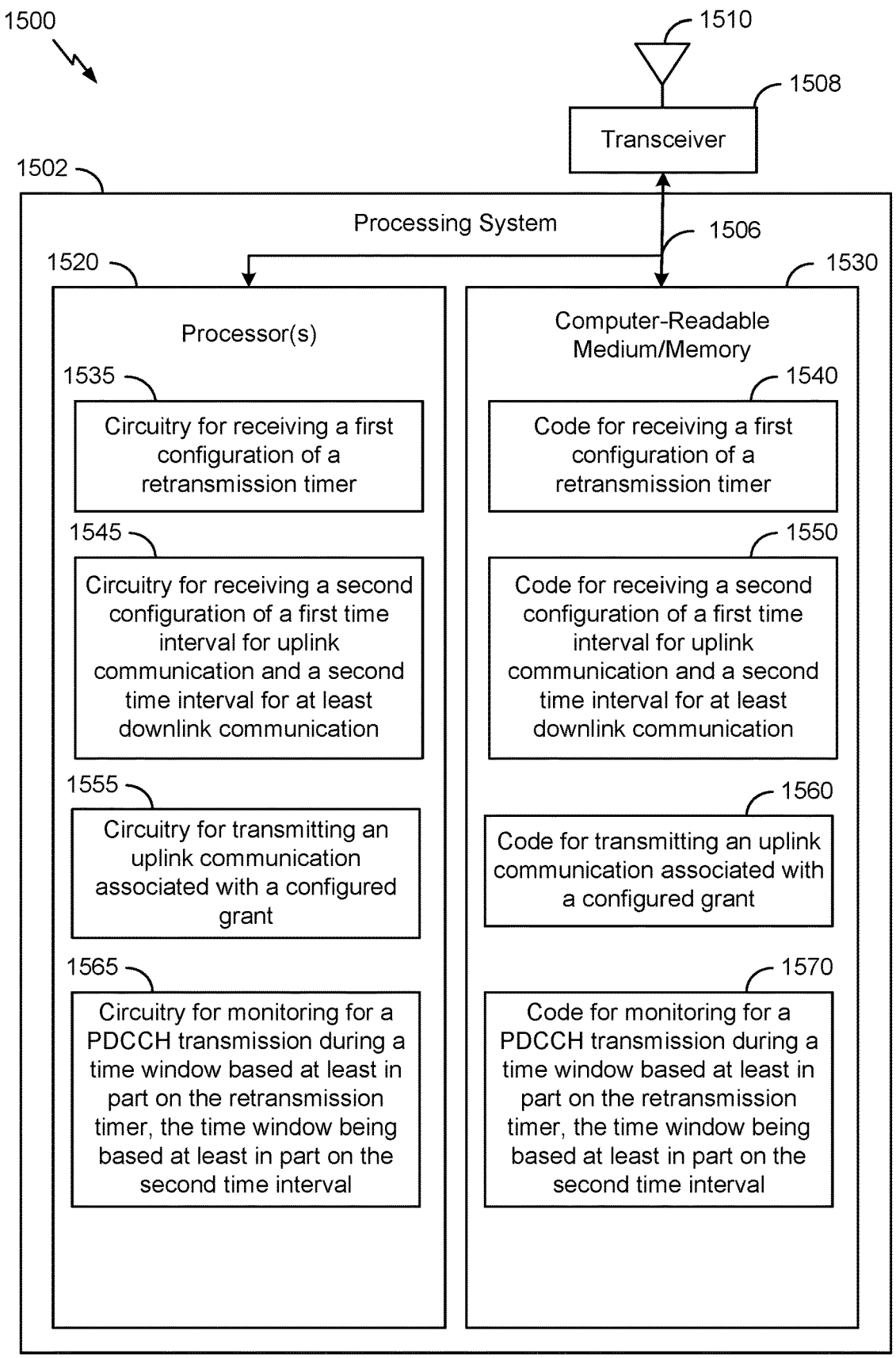
FIG. 15 is a diagram illustrating an example of an implementation of code and circuitry for a communications device, in accordance with the present disclosure.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Figure 14:
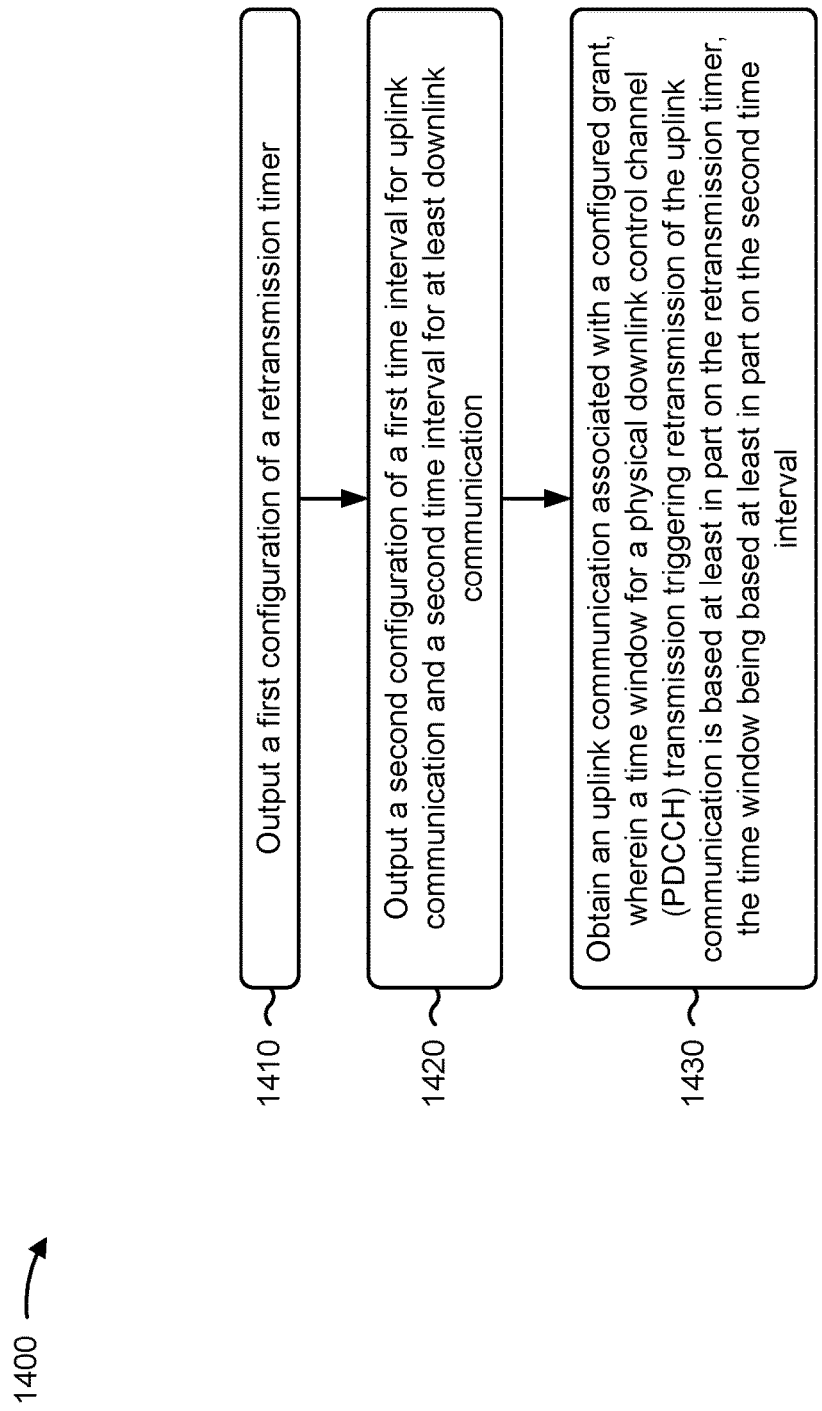
FIG. 14 shows a method for wireless communications by a network entity, such as BS, or a disaggregated BS, in accordance with the present disclosure.

FIG. 14 shows a method 1400 for wireless communications by a network entity, such as BS 110, or a disaggregated BS as discussed with respect to FIG. 3.

Method 1400 begins at step 1410 with outputting a first configuration of a retransmission timer.

Method 1400 then proceeds to step 1420 with outputting a second configuration of a first time interval for uplink communication and a second time interval for at least downlink communication.

Method 1400 then proceeds to step 1430 with obtaining an uplink communication associated with a configured grant, wherein a time window for a PDCCH transmission triggering retransmission of the uplink communication is based at least in part on the retransmission timer, the time window being based at least in part on the second time interval.

In a first aspect, the time window is a first time window and the first configuration defines a second time window based at least in part on the retransmission timer.

In a second aspect, alone or in combination with the first aspect, the first time window is different from the second time window.

In a third aspect, alone or in combination with one or more of the first and second aspects, the first configuration further includes a configured grant configuration of the configured grant.

In a fourth aspect, alone or in combination with one or more of the first through third aspects, the second configuration comprises at least one of a connected-mode discontinuous reception configuration, a configuration of a pattern of network energy savings states, a network discontinuous reception configuration, a network discontinuous transmission configuration, or a combination thereof.

In a fifth aspect, alone or in combination with one or more of the first through fourth aspects, the time window is fully overlapped with the second time interval.

In a sixth aspect, alone or in combination with one or more of the first through fifth aspects, the time window is a first time window, the first configuration defines a second time window based at least in part on the retransmission timer, and the second time window is at least partially non-overlapped with the second time interval.

In a seventh aspect, alone or in combination with one or more of the first through sixth aspects, a first start of the time window is aligned with a second start of the second time interval.

In an eighth aspect, alone or in combination with one or more of the first through seventh aspects, the time window is a first time window, the first configuration defines a second time window based at least in part on the retransmission timer, and a third start of the second time window is not aligned with the second start of the second time interval.

In a ninth aspect, alone or in combination with one or more of the first through eighth aspects, the time window is a first time window, the first configuration defines a second time window based at least in part on the retransmission timer, and the first start of the first time window is aligned with the second start of the second time interval based at least in part on the second time window overlapping with the second time interval by less than a threshold.

In a tenth aspect, alone or in combination with one or more of the first through ninth aspects, method 1400 includes outputting information indicating the threshold.

In an eleventh aspect, alone or in combination with one or more of the first through tenth aspects, the first configuration indicates a round-trip timer associated with the retransmission timer, wherein obtaining the uplink communication further comprises obtaining the uplink communication within a length of the round-trip timer of the second start of the second time interval, and wherein the time window is aligned with the second start of the second time interval based at least in part on the uplink communication being obtained within the length of the round-trip timer of the second start of the second time interval.

Figure 16:
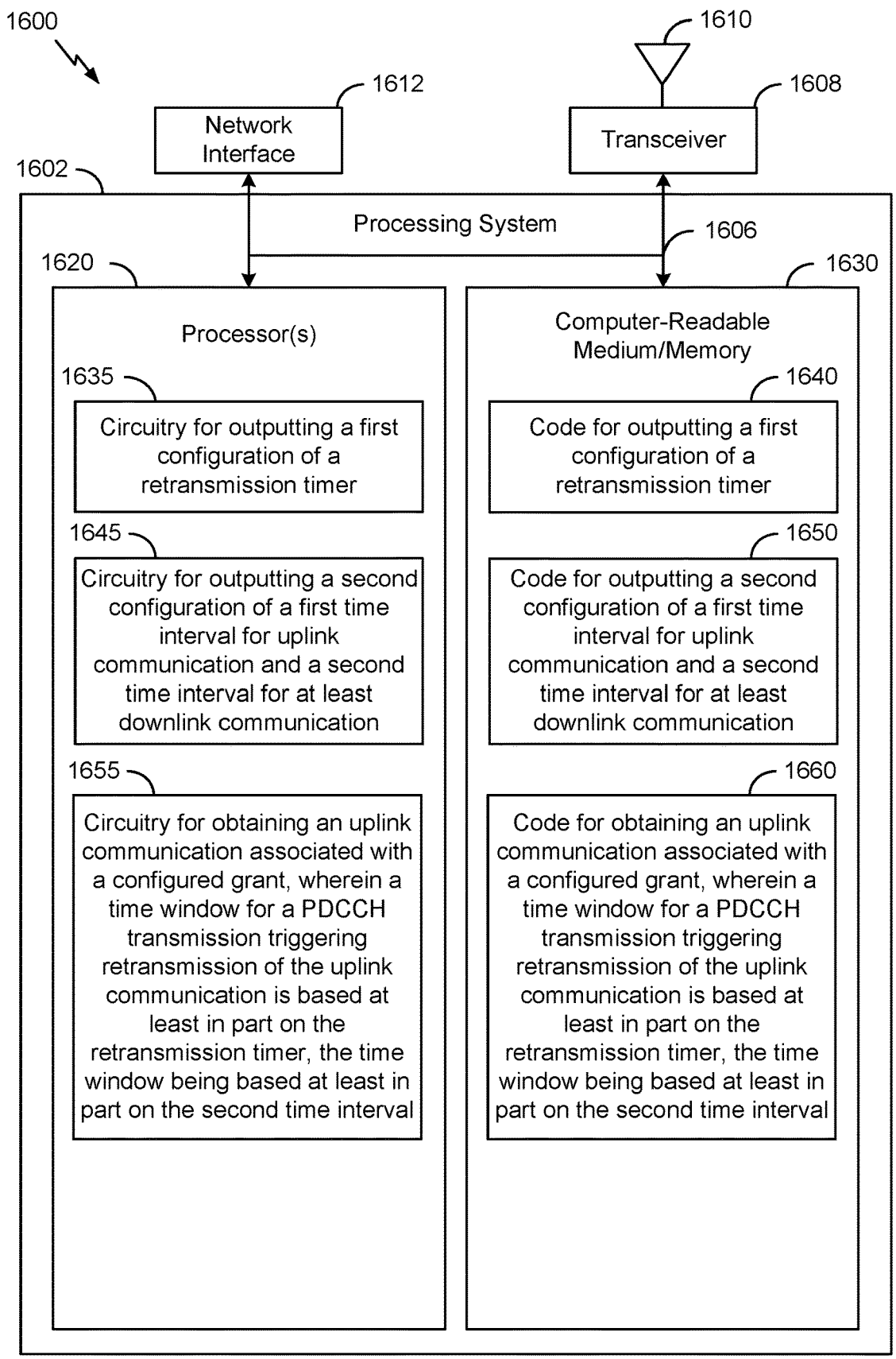
FIG. 16 is a diagram illustrating an example of an implementation of code and circuitry for a communications device, in accordance with the present disclosure.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

FIG. 15 is a diagram illustrating an example of an implementation of code and circuitry for a communications device 1500, in accordance with the present disclosure. The communications device 1500 may be a UE, or a UE may include the communications device 1500.

The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes one or more processors 1520. In various aspects, the one or more processors 1520 may be representative of one or more of receive processor 258, transmit processor 264, TX MIMO processor 266, and/or controller/processor 280, as described with respect to FIG. 2. The one or more processors 1520 are coupled to a computer-readable medium/memory 1530 via a bus 1506. In various aspects, the computer-readable medium/memory 1530 may be representative of memory 282, as described with respect to FIG. 2. In certain aspects, the computer-readable medium/memory 1530 is configured to store instructions (e.g., computer-executable code, processor-executable code) that when executed by the one or more processors 1520, cause the one or more processors 1520 to perform the method 1300 described with respect to FIG. 13, or any aspect related to it. Note that reference to a processor performing a function of communications device 1500 may include one or more processors performing that function of communications device 1500.

As shown in FIG. 15, the communications device 1500 may include circuitry for receiving a first configuration of a retransmission timer (circuitry 1535).

As shown in FIG. 15, the communications device 1500 may include, stored in computer-readable medium/memory 1530, code for receiving a first configuration of a retransmission timer (code 1540).

As shown in FIG. 15, the communications device 1500 may include circuitry for receiving a second configuration of a first time interval for uplink communication and a second time interval for at least downlink communication (circuitry 1545).

As shown in FIG. 15, the communications device 1500 may include, stored in computer-readable medium/memory 1530, code for receiving a second configuration of a first time interval for uplink communication and a second time interval for at least downlink communication (code 1550).

As shown in FIG. 15, the communications device 1500 may include circuitry for transmitting an uplink communication associated with a configured grant (circuitry 1555).

As shown in FIG. 15, the communications device 1500 may include, stored in computer-readable medium/memory 1530, code for transmitting an uplink communication associated with a configured grant (code 1560).

As shown in FIG. 15, the communications device 1500 may include circuitry for monitoring for a PDCCH transmission during a time window based at least in part on the retransmission timer, the time window being based at least in part on the second time interval (circuitry 1565).

As shown in FIG. 15, the communications device 1500 may include, stored in computer-readable medium/memory 1530, code for monitoring for a PDCCH transmission during a time window based at least in part on the retransmission timer, the time window being based at least in part on the second time interval (code 1570).

Various components of the communications device 1500 may provide means for performing the method 1300 described with respect to FIG. 13, or any aspect related to it. For example, means for transmitting, sending, or outputting for transmission may include the transceiver(s) 254 and/or antenna(s) 252 of the UE 120 and/or transceiver 1508 and antenna 1510 of the communications device 1500 in FIG. 15. Means for receiving or obtaining may include the transceiver(s) 254 and/or antenna(s) 252 of the UE 120 and/or transceiver 1508 and antenna 1510 of the communications device 1500 in FIG. 15.

FIG. 15 is provided as an example. Other examples may differ from what is described in connection with FIG. 15.

FIG. 16 is a diagram illustrating an example of an implementation of code and circuitry for a communications device 1600, in accordance with the present disclosure. The communications device 1600 may be a network entity (such as BS 110 or a disaggregated BS as described with regard to FIG. 3), or a network entity may include the communications device 1600.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The network interface 1612 is configured to obtain and send signals for the communications device 1600 via communications link(s), such as a backhaul link, midhaul link, and/or fronthaul link as described herein, such as with respect to FIG. 3. The processing system 1602 may be configured to perform processing functions for the communications device 1600, including processing signals received and/or to be transmitted by the communications device 1600.

The processing system 1602 includes one or more processors 1620. In various aspects, the one or more processors 1620 may be representative of one or more of receive processor 238, transmit processor 220, TX MIMO processor 230, and/or controller/processor 240, as described with respect to FIG. 2. The one or more processors 1620 are coupled to a computer-readable medium/memory 1630 via a bus 1606. In various aspects, the computer-readable medium/memory 1630 may be representative of memory 242, as described with respect to FIG. 2. In certain aspects, the computer-readable medium/memory 1630 is configured to store instructions (e.g., computer-executable code, processor-executable code) that when executed by the one or more processors 1620, cause the one or more processors 1620 to perform the method 1400 described with respect to FIG. 14, or any aspect related to it. Note that reference to a processor performing a function of communications device 1600 may include one or more processors performing that function of communications device 1600.

As shown in FIG. 16, the communications device 1600 may include circuitry for outputting a first configuration of a retransmission timer (circuitry 1635).

As shown in FIG. 16, the communications device 1600 may include, stored in computer-readable medium/memory 1630, code for outputting a first configuration of a retransmission timer (code 1640).

As shown in FIG. 16, the communications device 1600 may include circuitry for outputting a second configuration of a first time interval for uplink communication and a second time interval for at least downlink communication (circuitry 1645).

As shown in FIG. 16, the communications device 1600 may include, stored in computer-readable medium/memory 1630, code for outputting a second configuration of a first time interval for uplink communication and a second time interval for at least downlink communication (code 1650).

As shown in FIG. 16, the communications device 1600 may include circuitry for obtaining an uplink communication associated with a configured grant, wherein a time window for a PDCCH transmission triggering retransmission of the uplink communication is based at least in part on the retransmission timer, the time window being based at least in part on the second time interval (circuitry 1655).

As shown in FIG. 16, the communications device 1600 may include, stored in computer-readable medium/memory 1630, code for obtaining an uplink communication associated with a configured grant, wherein a time window for a PDCCH transmission triggering retransmission of the uplink communication is based at least in part on the retransmission timer, the time window being based at least in part on the second time interval (code 1660).

Various components of the communications device 1600 may provide means for performing the method 1400 described with respect to FIG. 14, or any aspect related to it. For example, means for transmitting, sending, or outputting for transmission may include the transceiver(s) 232 and/or antenna(s) 234 of the BS 110 and/or transceiver 1608 and antenna 1610 of the communications device 1600 in FIG. 16. Means for receiving or obtaining may include the transceiver(s) 232 and/or antenna(s) 234 of the BS 110 and/or transceiver 1608 and antenna 1610 of the communications device 1600 in FIG. 16.

FIG. 16 is provided as an example. Other examples may differ from what is described in connection with FIG. 16.

The following provides an overview of some Aspects of the present disclosure:

Aspect 1: A method of wireless communication performed by a user equipment (UE), comprising: receiving a first configuration of a retransmission timer; receiving a second configuration of a first time interval for uplink communication and a second time interval for at least downlink communication; transmitting an uplink communication associated with a configured grant; and monitoring for a physical downlink control channel (PDCCH) transmission during a time window based at least in part on the retransmission timer, the time window being based at least in part on the second time interval.

Aspect 2: The method of Aspect 1, wherein the time window is a first time window and the first configuration defines a second time window based at least in part on the retransmission timer.

Aspect 3: The method of Aspect 2, wherein the first time window is different from the second time window.

Aspect 4: The method of any of Aspects 1-3, wherein the first configuration further includes a configured grant configuration of the configured grant.

Aspect 5: The method of any of Aspects 1-4, wherein the second configuration comprises at least one of: a connected-mode discontinuous reception configuration, a configuration of a pattern of network energy saving states, a network discontinuous reception configuration, a network discontinuous transmission configuration, or a combination thereof.

Aspect 6: The method of any of Aspects 1-5, wherein the time window is fully overlapped with the second time interval.

Aspect 7: The method of Aspect 6, wherein the time window is a first time window, the first configuration defines a second time window based at least in part on the retransmission timer, and the second time window is at least partially non-overlapped with the second time interval.

Aspect 8: The method of any of Aspects 1-7, wherein a first start of the time window is aligned with a second start of the second time interval.

Aspect 9: The method of Aspect 8, wherein the time window is a first time window, the first configuration defines a second time window based at least in part on the retransmission timer, and a third start of the second time window is not aligned with the second start of the second time interval.

Aspect 10: The method of Aspect 8, wherein the time window is a first time window, the first configuration defines a second time window based at least in part on the retransmission timer, and the first start of the first time window is aligned with the second start of the second time interval based at least in part on the second time window overlapping with the second time interval by less than a threshold amount of time.

Aspect 11: The method of Aspect 10, further comprising receiving information indicating the threshold amount of time.

Aspect 12: The method of Aspect 8, wherein the first configuration indicates a round-trip timer associated with the retransmission timer, wherein transmitting the uplink communication further comprises transmitting the uplink communication within a length of the round-trip timer from the second start of the second time interval, and wherein the time window is aligned with the second start of the second time interval based at least in part on the uplink communication being transmitted within the length of the round-trip timer from the second start of the second time interval.

Aspect 13: The method of any of Aspects 1-12, wherein the PDCCH transmission is for retransmission of the uplink communication.

Aspect 14: A method of wireless communication performed by a network entity, comprising: outputting a first configuration of a retransmission timer; outputting a second configuration of a first time interval for uplink communication and a second time interval for at least downlink communication; and obtaining an uplink communication associated with a configured grant, wherein a time window for a physical downlink control channel (PDCCH) transmission triggering retransmission of the uplink communication is based at least in part on the retransmission timer, the time window being based at least in part on the second time interval.

Aspect 15: The method of Aspect 14, wherein the time window is a first time window and the first configuration defines a second time window based at least in part on the retransmission timer.

Aspect 16: The method of Aspect 15, wherein the first time window is different from the second time window.

Aspect 17: The method of any of Aspects 14-16, wherein the first configuration further includes a configured grant configuration of the configured grant.

Aspect 18: The method of any of Aspects 14-17, wherein the second configuration comprises at least one of: a connected-mode discontinuous reception configuration, a configuration of a pattern of network energy savings states, a network discontinuous reception configuration, a network discontinuous transmission configuration, or a combination thereof.

Aspect 19: The method of any of Aspects 14-18, wherein the time window is fully overlapped with the second time interval.

Aspect 20: The method of Aspect 19, wherein the time window is a first time window, the first configuration defines a second time window based at least in part on the retransmission timer, and the second time window is at least partially non-overlapped with the second time interval.

Aspect 21: The method of any of Aspects 14-20, wherein a first start of the time window is aligned with a second start of the second time interval.

Aspect 22: The method of Aspect 21, wherein the time window is a first time window, the first configuration defines a second time window based at least in part on the retransmission timer, and a third start of the second time window is not aligned with the second start of the second time interval.

Aspect 23: The method of Aspect 21, wherein the time window is a first time window, the first configuration defines a second time window based at least in part on the retransmission timer, and the first start of the first time window is aligned with the second start of the second time interval based at least in part on the second time window overlapping with the second time interval by less than a threshold.

Aspect 24: The method of Aspect 23, further comprising outputting information indicating the threshold.

Aspect 25: The method of Aspect 21, wherein the first configuration indicates a round-trip timer associated with the retransmission timer, wherein obtaining the uplink communication further comprises obtaining the uplink communication within a length of the round-trip timer of the second start of the second time interval, and wherein the time window is aligned with the second start of the second time interval based at least in part on the uplink communication being obtained within the length of the round-trip timer of the second start of the second time interval.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
    a memory; and one or more processors, coupled to the memory, configured to:
receive a first configuration of a retransmission timer;
receive a second configuration of a first time interval for uplink communication and a second time interval for at least downlink communication;
transmit an uplink communication associated with a configured grant; and
monitor for a physical downlink control channel (PDCCH) transmission during a time window based at least in part on the retransmission timer, the time window being based at least in part on the second time interval,
wherein a first start of the time window is aligned with a second start of the second time interval, and
wherein the time window is a first time window, the first configuration defines a second time window based at least in part on the retransmission timer, and a third start of the second time window is not aligned with the second start of the second time interval.

2. The UE of claim 1, wherein the first time window is different from the second time window.

3. The UE of claim 1, wherein the first configuration further includes a configured grant configuration of the configured grant.

4. The UE of claim 1, wherein the second configuration comprises at least one of:
a connected-mode discontinuous reception configuration,
a configuration of a pattern of network energy saving states,
a network discontinuous reception configuration,
a network discontinuous transmission configuration, or
a combination thereof.

5. The UE of claim 1, wherein the time window is fully overlapped with the second time interval.

6. The UE of claim 5, wherein the second time window is at least partially non-overlapped with the second time interval.

7. The UE of claim 1, wherein the first start of the first time window is aligned with the second start of the second time interval based at least in part on the second time window overlapping with the second time interval by less than a threshold amount of time.

8. The UE of claim 7, wherein the one or more processors are further configured to receive information indicating the threshold amount of time.

9. The UE of claim 1, wherein the first configuration indicates a round-trip timer associated with the retransmission timer, wherein the one or more processors, to transmit the uplink communication, are configured to transmit the uplink communication within a length of the round-trip timer from the second start of the second time interval, and wherein the time window is aligned with the second start of the second time interval based at least in part on the uplink communication being transmitted within the length of the round-trip timer from the second start of the second time interval.

10. The UE of claim 1, wherein the PDCCH transmission is for retransmission of the uplink communication.

11. A network entity for wireless communication, comprising:
a memory; and
one or more processors, coupled to the memory, configured to:
output a first configuration of a retransmission timer;
output a second configuration of a first time interval for uplink communication and a second time interval for at least downlink communication; and
obtain an uplink communication associated with a configured grant, wherein a time window for a physical downlink control channel (PDCCH) transmission triggering retransmission of the uplink communication is based at least in part on the retransmission timer, the time window being based at least in part on the second time interval,
wherein a first start of the time window is aligned with a second start of the second time interval, and
wherein the time window is a first time window, the first configuration defines a second time window based at least in part on the retransmission timer, and a third start of the second time window is not aligned with the second start of the second time interval.

12. The network entity of claim 11, wherein the first time window is different from the second time window.

13. The network entity of claim 11, wherein the first configuration further includes a configured grant configuration of the configured grant.

14. The network entity of claim 11, wherein the second configuration comprises at least one of:
a connected-mode discontinuous reception configuration,
a configuration of a pattern of network energy savings states,
a network discontinuous reception configuration,
a network discontinuous transmission configuration, or
a combination thereof.

15. The network entity of claim 11, wherein the time window is fully overlapped with the second time interval.

16. The network entity of claim 15, wherein the second time window is at least partially non-overlapped with the second time interval.

17. The network entity of claim 11, wherein the first start of the first time window is aligned with the second start of the second time interval based at least in part on the second time window overlapping with the second time interval by less than a threshold.

18. The network entity of claim 17, wherein the one or more processors are further configured to output information indicating the threshold.

19. The network entity of claim 18, wherein the first configuration indicates a round-trip timer associated with the retransmission timer, wherein the one or more processors, to obtain the uplink communication, are configured to obtain the uplink communication within a length of the round-trip timer of the second start of the second time interval, and wherein the time window is aligned with the second start of the second time interval based at least in part on the uplink communication being obtained within the length of the round-trip timer of the second start of the second time interval.

20. A method of wireless communication performed by a user equipment (UE), comprising:
receiving a first configuration of a retransmission timer;
receiving a second configuration of a first time interval for uplink communication and a second time interval for at least downlink communication;
transmitting an uplink communication associated with a configured grant; and
monitoring for a physical downlink control channel (PDCCH) transmission during a time window based at least in part on the retransmission timer, the time window being based at least in part on the second time interval, wherein a first start of the time window is aligned second start of the second time interval, and wherein the time window is a first time window, the first configuration defines a second time window based at least in part on the retransmission timer, and a third start of the second time window is not aligned with the second start of the second time interval.

21. The method of claim 20, wherein the first configuration further includes a configured grant configuration of the configured grant.

22. The method of claim 20, wherein the second configuration comprises at least one of:
a connected-mode discontinuous reception configuration,
a configuration of a pattern of network energy saving states,
a network discontinuous reception configuration,
a network discontinuous transmission configuration, or
a combination thereof.

23. The method of claim 20, wherein the PDCCH transmission is for retransmission of the uplink communication.

24. A method of wireless communication performed by a network entity, comprising:
outputting a first configuration of a retransmission timer;
outputting a second configuration of a first time interval for uplink communication and a second time interval for at least downlink communication; and
obtaining an uplink communication associated with a configured grant, wherein a time window for a physical downlink control channel (PDCCH) transmission triggering retransmission of the uplink communication is based at least in part on the retransmission timer, the time window being based at least in part on the second time interval, wherein a first start of the time window is aligned with a second start of the second time interval, and wherein the time window is a first time window, the first configuration defines a second time window based at least in part on the retransmission timer, and a third start of the second time window is not aligned with the second start of the second time interval.

25. The method of claim 24, wherein the first configuration further includes a configured grant configuration of the configured grant.

26. The method of claim 24, wherein the second configuration comprises at least one of:
a connected-mode discontinuous reception configuration,
a configuration of a pattern of network energy saving states,
a network discontinuous reception configuration,
a network discontinuous transmission configuration, or
a combination thereof.

27. The method of claim 24, wherein the PDCCH transmission is for retransmission of the uplink communication.

* * * * *